US009414572B2

(12) United States Patent
O'Brien et al.

(10) Patent No.: US 9,414,572 B2
(45) Date of Patent: Aug. 16, 2016

(54) RETRACTABLE LEASH

(71) Applicants: Carolyn O'Brien, Roswell, GA (US); John C. Evans, Sandy Springs, GA (US)

(72) Inventors: Carolyn O'Brien, Roswell, GA (US); John C. Evans, Sandy Springs, GA (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 37 days.

(21) Appl. No.: 14/268,403

(22) Filed: May 2, 2014

(65) Prior Publication Data

US 2014/0238314 A1  Aug. 28, 2014

Related U.S. Application Data

(63) Continuation-in-part of application No. 14/018,138, filed on Sep. 4, 2013, which is a continuation of application No. 13/604,566, filed on Sep. 5, 2012, now Pat. No. 8,683,960.

(51) Int. Cl.
*A01K 27/00* (2006.01)

(52) U.S. Cl.
CPC .................... *A01K 27/004* (2013.01)

(58) Field of Classification Search
CPC ............................ A01K 27/004; A01K 27/003
USPC .......... 119/796, 797, 794, 798, 769, 770, 857
See application file for complete search history.

(56) References Cited

U.S. PATENT DOCUMENTS

| | | | |
|---|---|---|---|
| 3,198,175 A | 8/1965 | Dean | |
| 3,693,596 A | 9/1972 | Croce et al. | |
| 3,853,283 A * | 12/1974 | Croce | A01K 27/004 119/796 |
| 5,377,626 A * | 1/1995 | Kilsby | A01K 27/004 119/796 |
| 5,701,981 A | 12/1997 | Marshall et al. | |
| 5,732,662 A * | 3/1998 | Jacobsen | A01K 27/005 119/798 |
| 5,762,029 A | 6/1998 | DuBois et al. | |
| D402,426 S | 12/1998 | Levine et al. | |
| 6,024,054 A | 2/2000 | Matt et al. | |
| 6,289,849 B1 | 9/2001 | Macedo et al. | |
| 6,792,893 B1 | 9/2004 | Quintero et al. | |
| 6,904,872 B2 * | 6/2005 | Muller | B65H 75/4431 119/789 |
| 7,207,296 B2 | 4/2007 | DiDonato | |
| 7,322,316 B2 | 1/2008 | Blandford | |
| 7,325,515 B2 | 2/2008 | Hetland | |
| D574,981 S | 8/2008 | Mattheis | |
| 7,455,034 B2 | 11/2008 | DiDonato | |
| D595,882 S | 7/2009 | Dupps et al. | |
| 7,559,292 B2 | 7/2009 | Blandford | |
| 7,610,880 B2 * | 11/2009 | Lord | A01K 27/004 119/794 |
| 7,621,856 B1 * | 11/2009 | Keith | A01K 27/004 119/796 |
| 7,762,215 B2 | 7/2010 | Horton | |
| 7,896,281 B2 * | 3/2011 | Bleshoy | A01K 27/004 119/796 |
| D635,725 S | 4/2011 | Levy et al. | |
| 7,980,202 B2 | 7/2011 | Bentz et al. | |
| D643,161 S | 8/2011 | Leedom et al. | |
| D650,102 S | 12/2011 | Pearson | |

(Continued)

*Primary Examiner* — Yvonne Abbott-Lewis
(74) *Attorney, Agent, or Firm* — Global IP Counselors, LLP

(57) ABSTRACT

A two or more subject retractable leash, and methods of use thereof, is disclosed, which includes a roll-back feature on each retractable leash. The leashes may be locked in place by engaging a single lever. The leashes retract regardless of whether the spools are locked or unlocked. Each leash retracts independently of the other leashes, such that a dual leash may be used to walk one subject. In some embodiments, a single subject retractable leash includes a roll-back feature that provides and allows for leash retraction, whether or not a brake associated with a spool thereof is engaged.

20 Claims, 22 Drawing Sheets

(56) References Cited

U.S. PATENT DOCUMENTS

| | | | |
|---|---|---|---|
| D651,366 S | 12/2011 | Fisher et al. | |
| 8,151,735 B1 | 4/2012 | McCrocklin | |
| 8,201,964 B2 * | 6/2012 | Mattheis | F21L 4/027 119/796 |
| 8,251,020 B2 * | 8/2012 | Matthews | A01K 27/004 119/796 |
| 8,256,385 B2 | 9/2012 | Goldenberg | |
| 8,393,302 B1 | 3/2013 | Blakemore | |
| 8,418,659 B2 | 4/2013 | Harruna | |
| 8,683,960 B2 | 4/2014 | O'Brien et al. | |
| 2004/0154557 A1 | 8/2004 | Meissner | |
| 2005/0103282 A1 | 5/2005 | Huff et al. | |
| 2005/0263103 A1 | 12/2005 | Updyke et al. | |
| 2006/0144343 A1 | 7/2006 | Price | |
| 2006/0162675 A1 | 7/2006 | Ghalebi et al. | |
| 2006/0185618 A1 | 8/2006 | Hetland | |
| 2006/0201449 A1 | 9/2006 | Didonato | |
| 2006/0288961 A1 | 12/2006 | Blandford | |
| 2007/0215065 A1 | 9/2007 | Furlich | |
| 2008/0000433 A1 | 1/2008 | DiDonato | |
| 2008/0223308 A1 | 9/2008 | Stern | |
| 2009/0120376 A1 | 5/2009 | Foster | |
| 2011/0067649 A1 | 3/2011 | O'Brien et al. | |
| 2011/0180017 A1 | 7/2011 | Goldenberg | |
| 2011/0197820 A1 | 8/2011 | Goldy et al. | |
| 2014/0238314 A1 | 8/2014 | O'Brien et al. | |

\* cited by examiner

RETRACTABLE LEASH

CROSS REFERENCE TO RELATED APPLICATIONS

The present patent application is a continuation-in-part of, and hereby claims priority to, and full benefit of, U.S. patent application Ser. No. 14/018,138, filed on Sep. 4, 2013, which is a continuation of U.S. patent application Ser. No. 13/604,566, filed Sep. 5, 2012, now U.S. Pat. No. 8,683,960, issued Apr. 1, 2014, all of which are entitled "Retractable Leash," the entire contents of which are incorporated herein by reference.

FIELD OF THE INVENTION

The present disclosure relates generally to a single subject or a two subject (or dual) retractable leash, and methods of use regarding the same.

BACKGROUND

Pet owners typically enjoy walking, jogging, running, and the like with one or more pets along for accompaniment and exercise. Generally, the one or more pets are required to be leashed. Retractable leashes, as they currently exist, have many associated deficiencies and limitations.

Some of these deficiencies include: (1) in the case of dual leashes, that the retraction mechanisms are not independent for each leash, which means that they cannot be used to walk only one dog; (2) the leash or leashes do not roll back, retract, or rewind when the brake is engaged; and (3) no current leash includes a plurality of leashes that retract with a spinning housing.

Thus, there is a need for a retractable leash comprising a retractable leash (lead or tether) configuration that provides and allows for self-winding of a retractable lead associated therewith, whether or not the brake is engaged.

There is a further need for a retractable leash that has a plurality of retractable leashes that allows for: (1) walking a single dog without having the other leash(es) unwind; (2) independent self-winding of a plurality of retractable leashes, whether or not the brake is engaged; and (3) other features that keep the leashes from tangling while an individual is using the retractable leash.

Accordingly, it is to the provision of such retractable leash devices, and associated methods of use thereof, that the present disclosure is directed.

SUMMARY

The present disclosure relates to a retractable leash, and methods for using such leash. For example, the systems and methods may be used for leashing pets, children, or any other appropriate entity.

An example one-hand operable retractable leash apparatus includes a housing, a handle assembly, first and second spools, and first and second brakes. The housing includes a posterior portion and a curved anterior portion. The anterior portion is configured to have a first leash opening and a second leash opening. The handle assembly further includes a lever.

The first and second spools of the leash apparatus are rotatably connected to or attached to an axle, and the rotation of the first and second spools is independent from the axle. Each spool rotates in a direction opposite of the direction that the other spool is rotating. The first and second spools may optionally operate independently of each other. Furthermore, the first and second spools include a spring and a plurality of braking notches. The leash apparatus also includes first and second brakes, and these brakes are attached to a brake rod and are positioned such that the brakes are engageable with the plurality of braking notches on the spools. The brake rod passes through the rod openings of the brakes and the brake springs and anchors into the handle assembly.

The spools, the axle, the brakes, and the brake rod are adapted to the interior portion of the housing. The housing is adapted to connect or attach to the handle assembly. The curved anterior portion of the housing is configured to spin. The first leash opening and the second leash opening on the housing are optionally separated by a distance.

Each spool may include a retractable leash. For example, the retractable leashes may include a proximal end attached to the first and second spools and a distal end inserted through the first and second leash openings on the anterior portion of the housing.

The first and second spools may rotate about the axle when the first and second brakes are not engaged with the plurality of braking notches on the first and second spools. The first and second brakes are optionally engaged with the plurality of braking notches on the first and second spools, thus causing the first and second spools to cease rotation about the axle. The first and second spools include springs, and these springs may be constant-force springs.

The proximal ends of the springs may be fixably connected to the inner portions of the first and second spools, and then these springs may be wound within the inner portions of the first and second spools. The distal ends of the springs may optionally be configured to include tabs. The tabs on the distal ends of the springs may lock upon an opening to the inner portions of the first and second spools. Furthermore, the springs may be positioned in a first position where the first and second retractable leashes are fully wound on each of the first and second spools. For example, a spring may be disengaged from its first position where a force is exerted to withdraw the retractable leash from the housing, thereby rotating the spool. The spring may return to its first position where the force is ceased, thereby rewinding the retractable leash about the spool.

The first and second brakes, the first and second brake springs, and the brake rod may optionally attach to a braking plate. For example, the braking plate may include first, second, third, and fourth openings. A stop disk may engage the posterior of the braking plate. For example, the stop disk may include two protrusions for insertion into the first and second openings on the braking plate. Furthermore, the stop disk plate may include first and second holes for insertion of first and second plungers therethrough. Optionally, plunger springs are included about the first and second plungers and between the stop disk plate and the braking plate.

The plunger springs are optionally in a first position where the plunger springs are not compressed and the stop disk plate and braking plate are separated by a maximum distance. For example, the plunger springs are adapted to conform toward the first position. The plunger springs are optionally in a second position where the plunger springs are compressed and the stop disk plate and braking plate are separated by a distance less than the maximum distance. The plungers optionally contact the first and second brakes when the plunger springs are in the second position.

The lever on the example one-hand operable retractable leash apparatus may move between a first position and a second position. For example, the lever may include a lever spring between the lever and the handle assembly. The lever spring may be in a first position where the lever spring is not compressed. Furthermore, the lever spring may be in a second position where the lever spring is compressed. The lever may also include an actuator and a release cam. The lever may also include a catch.

An actuator arm may also connectably attach to the handle assembly. The actuator arm includes a proximal end and a distal end. The proximal end of the actuator arm may engage the actuator, and the distal end may engage the stop disk plate. For example, the lever spring may move to the second position, and the actuator may engage the proximal end of the actuator arm. The distal end may then engage the stop disk plate, and the plunger springs may move into the second position. A catch may optionally engage the proximal end of the actuator arm, holding the proximal end of the actuator arm in a position such that the plunger springs maintain the second position. Where the plunger springs are in the second position, the plungers may contact the first and second brakes. The first and second brakes may then subsequently engage one of the plurality of braking notches on the first and second spools.

Where the lever spring is in a second position, the actuator may engage. Where the actuator is optionally engaged, the first and second brakes may lock on each spool. Thus, further tension will optionally not allow unwinding of the retractable leashes. The catch may engage the proximal end of the actuator arm in a position such that the plunger springs maintain the second position. The release cam may disengage the catch. Where the release cam disengages the catch, the plunger springs may return to the first position. For example, disengagement of the actuator may allow the spools to freely rotate. Furthermore, a release in tension in the retractable leashes may allow the retractable leashes to rewind on the spools. Where the retractable leashes rewind on the spools, tension in the retractable leashes may engage the first and second brakes with one of the plurality of braking notches on the first and second spools. The example one-hand operable retractable leash apparatus may optionally include three or more retractable leashes and corresponding components.

Another embodiment of the current disclosure is an example one-hand operable retractable leash apparatus. The example one-hand operable retractable leash apparatus includes a housing, a handle assembly, a spool, and a brake. The housing includes a posterior portion and a curved anterior portion. The anterior portion is configured to have a leash opening. The handle assembly further includes a lever.

The spool of the leash apparatus is rotatably connected to or attached to an axle, and the rotation of the spool is independent from the axle. The spool includes a spring and a plurality of braking notches. The leash apparatus also includes a brake, and this brake is attached to a brake rod and is positioned such that the brake is engageable with the plurality of braking notches on the spool. The brake rod passes through the rod opening of the brake and the brake spring and anchors into the handle assembly.

The spool, the axle, the brake, and the brake rod are adapted to the interior portion of the housing. The housing is adapted to connect or attach to the handle assembly. The brake, the brake spring, and the brake rod may optionally attach to a braking plate. For example, the braking plate may include first and second openings. A stop disk may engage the posterior of the braking plate. For example, the stop disk may include a protrusion for insertion into the first opening on the braking plate. Furthermore, the stop disk plate may include a hole for insertion of a plunger therethrough. Optionally, a plunger spring is included about the plunger and between the stop disk plate and the braking plate.

The plunger spring is optionally in a first position where the plunger spring is not compressed and the stop disk plate and braking plate are separated by a maximum distance. For example, the plunger spring is adapted to conform toward the first position. The plunger spring is optionally in a second position where the plunger spring is compressed and the stop disk plate and braking plate are separated by a distance less than the maximum distance. The plunger optionally contacts the brake when the plunger spring is in the second position.

The lever on the example one-hand operable retractable leash apparatus may move between a first position and a second position. For example, the lever may include a lever spring between the lever and the handle assembly. The lever spring may be in a first position where the lever spring is not compressed. Furthermore, the lever spring may be in a second position where the lever spring is compressed. The lever may also include an actuator and a release cam.

An actuator arm may also connectably attach to the handle assembly. The actuator arm includes a proximal end and a distal end. The proximal end of the actuator arm may engage the lever, and the distal end may engage the stop disk plate. For example, the lever spring may move to the second position, and the lever may engage the proximal end of the actuator arm. The distal end may then engage the stop disk plate, and the plunger springs may move into the second position. Where the plunger spring is in the second position, the plunger may contact the brake. The brake may then subsequently engage one of the plurality of braking notches on the spool.

The leash apparatus optionally provides a roll-back feature for the spools. Where the lever spring is in a second position, the actuator may engage. Where the actuator is optionally engaged, the brake may lock on the spool. Thus, further tension will optionally not allow unwinding of the retractable leash. The release cam may disengage the actuator. Where the release cam disengages the actuator, the lever spring may return to the first position and the plunger spring may also return to the first position. For example, disengagement of the actuator may allow the spool to freely rotate. Furthermore, a release in tension in the retractable leash may allow the retractable leash to rewind on the spool. Where the retractable leash rewinds on the spool, tension in the retractable leash may engage the brake with one of the plurality of braking notches on the spool.

Also provided is a method for walking one or more two leashed subjects. The method includes attaching a first subject with a first retractable leash. A second subject is then optionally attached with a second retractable leash. Where a second subject is not attached to the leash apparatus, the user may optionally attach one subject, and the second retractable leash remains unused. The first and second retractable leashes are positioned through leash openings on a rotating housing. The first and second retractable leashes are configured to wind on self-winding spools. The rotating housing may spin according to the movement of the subjects to prevent tangling of the retractable leashes.

The user may optionally lock the position of the retractable leashes by squeezing the lever. The spools are self-winding, and the retractable leashes may be configured to rewind on the spools where the tension in the retractable leashes decreases. For the example, the brakes may engage the spools and may cease rotation of the spools where tension in the retractable leashes increases. The user may optionally unlock the position of the retractable leashes where the user squeezes the lever, thereby releasing the catch.

One embodiment of the invention is a retractable leash for multiple leash subjects comprising: a housing, wherein the housing is comprised of a posterior portion and an anterior portion, wherein the anterior portion has a plurality of leash openings; a handle assembly, wherein the handle assembly is comprised of a lever; a plurality of spools; wherein the plurality of spools are comprised of a plurality of springs; wherein the plurality of spools rotatably engage with an axle; a plurality of brakes; wherein each of the plurality of brakes is attached to a brake rod; wherein the plurality of brakes are configured to engage with the plurality of spools such that the spools are prevented from spinning in an unwinding direction; wherein the plurality of brakes are engaged with the plurality of spools when a force is applied to the lever; wherein the plurality of spools, the axle, the plurality of brakes, and the brake rod are within an interior portion of the housing; wherein the housing is connected to the handle assembly; and wherein the anterior portion of the housing is configured to rotate relative to the handle assembly. Preferably, the spinning in an unwinding direction of the plurality of spools around the axle is enabled when the plurality of brakes are not engaged with the plurality of spools. Preferably, the leash further comprises a plurality of leashes; wherein each of the plurality of leashes pass through one of the plurality of leash openings; wherein a proximal end of each of the plurality of leashes are connected to and substantially wound around one of the plurality of spools; wherein the distal end of each of the plurality of leashes is exterior to one of the plurality of leash openings of the housing; and wherein the rotating anterior portion of the housing spins according to movement of the plurality of leashes to prevent tangling of the plurality of leashes when in use. Preferably, each of the plurality of spools has one of the plurality of springs; and wherein the plurality of springs are constant-force springs. Preferably, the plurality springs are in a first position when the plurality of leashes are essentially fully wound on each of the plurality of spools. Preferably, the plurality of spools are further comprised of a plurality of braking notches; wherein the plurality of brakes are configured to engage with the plurality of braking notches on the plurality of spools. Preferably, the at least one of the plurality of springs is disengaged from its first position when a pulling force is exerted on at least one leash of the plurality of leashes to withdraw the at least one leash from the housing thereby rotating at least one spool of the plurality of spools, and wherein the at least one spring returns to its first position when the pulling force is ceased, such that the at least one withdrawn leash is rewound on the at least one spool. Preferably, the plurality of brakes, the plurality of springs, and the brake rod are adapted to attach to a braking plate; wherein the braking plate comprises a plurality of openings; wherein a stop disk plate is configured to engage a posterior of the braking plate, and wherein the stop disk plate comprises a plurality of protrusions, wherein the plurality of protrusions are adapted for insertion into the plurality of openings of the braking plate; wherein the stop disk plate comprises a plurality of holes for insertion of a plurality of plungers therethrough; wherein the plurality of plungers are engaged with a plurality of plunger springs, wherein the plurality of plunger springs are adapted to be between the stop disk plate and the braking plate; and wherein the plurality of plunger springs are in a first position when the plurality of plunger springs are not compressed and the stop disk plate and braking plate are separated by a maximum distance. The plurality of plunger springs are in a second position when the plurality of plunger springs are compressed and the stop disk plate and braking plate are separated by a distance less than the maximum distance; wherein the plurality of plungers contact and engage the plurality of brakes when the plurality of plunger springs are in the second position. Preferably, the lever is comprised of a lever spring, actuator, and release cam that allows the lever to move back and forth between a first position and a second position in a spring loaded manner when the force is applied to the lever; wherein when the lever is moved to the second position the plurality of brakes are engaged with the plurality of notches of the plurality of spools; and wherein when the lever is allowed to return to the first position and then moved to a position between (typically about half-way between) said first position and said second position, the plurality of brakes are disengaged with the plurality of notches of the plurality of spools. Preferably, a release in a tension in the plurality of leashes allows the plurality of leashes to rewind or roll back on the plurality of spools both when the plurality of brakes are engaged and when the plurality of brakes are disengaged. Preferably, the leash includes a separator, wherein said separator has a plurality of leash apertures and prevents the plurality of leashes from becoming entangled within the housing. Preferably, the plurality of spools unwind and rewind independently of each other, which allows the user to walk only one dog/pet/subject.

In another embodiment of the retractable leash for two leash subjects comprising: a housing, wherein the housing is comprised of a posterior portion and an anterior portion, wherein the anterior portion has two leash openings; a handle assembly, wherein the handle assembly is comprised of a lever; wherein the lever has a first position and a second position; a first spool; a second spool; wherein the first and second spools each have a spring; wherein the first and second spools, independently and in opposite directions, rotatably engage with an axle; a first brake; a second brake; wherein the first and second brakes are attached to a brake rod; wherein the first and second spools each have a plurality of brake notches; wherein the plurality of brake notches are configured to engage with the first and second brakes such that the first and second spools are prevented from spinning in an unwinding direction when the first and second brakes are engaged with the plurality of brake notches; wherein the first and second brakes are engaged with the plurality of brake notches when a force is applied to the lever to move the lever from a first position to a second position; wherein the first and second spools, the axle, the first and second brakes, and the brake rod are within an interior portion of the housing; wherein the housing is connected to the handle assembly; and wherein the anterior portion of the housing is configured to spin relative to the handle assembly. Preferably, the spinning in an unwinding direction of the first and second spools around the axle is enabled when the first and second brakes are not engaged with the plurality of spools. Preferably, the leash further comprises a first leash; and a second leash; wherein each of the first and second leashes passes through one of the two leash openings; wherein a proximal end of each of the first and second leashes are connected to and substantially wound around one of the first and second spools; wherein the distal end of each of the first and second leashes is exterior to one of the two leash openings of the housing; wherein a release in a tension in the first and second leashes allows the first and second leashes to rewind on the first and second spools when the first and second brakes are engaged and when the first and second brakes are disengaged; and wherein the rotating anterior portion of the housing spins according to movement of the first and second leashes to prevent tangling of the first and second leashes when in use. Preferably, the springs are constant-force springs; wherein the springs are in a first position when the first and second leashes are essentially fully wound on each of the first and second spools. Preferably, the at least one of the springs is disengaged from its first position when a pulling force is exerted on at least one leash of the first and second leashes to withdraw the at least one leash from the housing thereby rotating at least one spool of the first and second spools, and wherein the at least one spring returns to its first position when the pulling force is ceased, such that the at least one withdrawn leash is rewound on the at least one spool. Preferably, the first and second brakes, the springs, and the brake rod are adapted to attach to a braking plate; wherein the braking plate comprises a plurality of openings; wherein a stop disk plate is configured to engage a posterior of the braking plate, and wherein the stop disk plate comprises a plurality of protrusions, wherein the plurality of protrusions are adapted for insertion into the plurality of openings of the braking plate; wherein the stop disk plate comprises a plurality of holes for insertion of a plurality of plungers therethrough; wherein the plurality of plungers are engaged with a plurality of plunger springs, wherein the plurality of plunger springs are adapted to be between the stop disk plate and the braking plate; and wherein the plurality of plunger springs are in a first position when the plurality of plunger springs are not compressed and the stop disk plate and braking plate are separated by a maximum distance. Preferably, the plurality of plunger springs are in a second position when the plurality of plunger springs are compressed and the stop disk plate and braking plate are separated by a distance less than the maximum distance; and wherein the plurality of plungers contact and engage the plurality of brakes when the plurality of plunger springs are in the second position. Preferably, the lever is comprised of a lever spring, actuator, and release cam that allows the lever to move back and forth between a first position and a second position in a spring loaded manner when the force is applied to the lever; wherein when the lever is moved to the second position the first and second brakes are engaged with the plurality of notches of the first and second spools; and wherein when the lever is allowed to return to said first position and then moved to a position between the first position and the second position, the first and second brakes are disengaged with the plurality of notches of the first and second spools. Preferably, the leash includes a separator, wherein said separator has two leash apertures and prevents the plurality of leashes from becoming entangled within the housing.

Another embodiment of the present invention is a method for walking one or more leashed subjects, the steps comprising: providing a retractable leash device, wherein the retractable leash device is comprised of a first retractable leash, a second retractable leash, and a rotating housing; attaching a first subject to the first retractable leash; attaching a second subject to the second retractable leash; wherein the first and second retractable leashes are positioned through a first and second leash openings on the rotating housing; wherein the first and second retractable leashes are configured to wind on self-winding spools; wherein the rotating housing spins according to movement of the first and second subjects to prevent tangling of the first and second retractable leashes; locking the first and second retractable leashes by squeezing a lever on a handle of the retractable leash device; and wherein the first and second retractable leashes are configured to rewind on the self-winding spools when a pulling tension on the first and second retractable leashes ceases, regardless of whether the retractable leash device is locked.

Also provided is an alternative embodiment of a retractable leash assembly for a single leash subject. A leash associated with a spool may be attached to the spool and the spool may be rotationally biased within its housing by operation of an associated spring. The spool is provided with a plurality of braking notches. Pawl clearance areas are provided between braking notches. The retractable leash assembly is further provided with a brake having pawls. The pawls are configured so as to be cooperatively operable at one end thereof with the spool, pawl clearance areas, braking notches, and cam surfaces.

The brake is further configured so as to be captured by, and cooperatively operable with, an operating button. The operating button is configured so as to be cooperatively and interoperably associated with a locking button. The operating button and locking button are configured to be retained in relative position by the housing. The operating button retains a transverse pin. In association with the operating button, the transverse pin secures the pawls in position sufficient for spanning the spool. A torsional spring is retained within the operating button by the transverse pin running centrally therethrough. One end of the torsional spring is configured to bear against an internal portion of the operating button. A second end of the torsional spring is configured to bear against the transverse pin, which is also retained by the brake. The transverse pin further aids in securing and maintaining the pawls in the proper configuration in association with the brake. The torsional spring thus serves to bias the brake into an appropriate position for interaction with the spool, pawl clearance areas, braking notches, and cam surfaces.

When the operating button is not engaged by a user, it is held in an outwardly biased, neutral position by operation of the spring. When the operating button is depressed by a user, the spring compresses, and such compression acts to bias the operating button outwardly with respect to housing 806 and toward its neutral position.

The operating button is further configured to provide a bearing surface, which may take the form of an externally molded shoulder, or the like. The locking button is provided with an abutment surface, which, when the locking button is engaged by a user, is urged into contact with the bearing surface, and which acts to hold the operating button in its downward-most position with respect to the housing. This serves to hold the spring in a compressed configuration with respect to the operating button.

Once the operating button has been depressed by user action, and as the locking button is urged into a locked configuration by further user action, the extension cams along inner wall, which carries a wall cam surface. The abutment surface is, thereby, urged into contact with the bearing surface. Force exerted by the abutment surface against the housing and bearing surface enables the locking button to maintain the operating button in its locked, downward-most position. User disengagement of the locking button allows the extension to disengage from the wall cam surface, biasing the locking button to its unlocked configuration. The user may thereafter allow the operating button to return to its neutral position, assisted by operation of the spring.

So configured, the spool is urged and biased to rotate in a reversing, retraction mode of operation by its spring. In this direction, the spool is allowed to rotate freely, since the pawls are allowed to traverse the pawl clearance areas; whereafter, the pawls are biased by their torsional spring to ride easily and smoothly along the spool cam surfaces. The spool can, thereby, act to wind-up the leash, since there is no engagement between the pawls and the braking notches. Should the leashed subject pull away from the user while the brake remains engaged and/or locked, the spool is reversed into its play-out direction. The pawls traverse the pawl clearance areas; whereafter, the pawls are biased by their torsional spring to drop into and re-engage against the braking notches.

Accordingly, in operation, a leashed subject can be allowed to freely roam, pulling away from and coming closer to the user, when the retractable leash assembly is in its deactivated, unlocked configuration. When the user determines that it is dangerous or disadvantageous to allow the subject further outward travel, the user may depress the operating button; thereby, locking the spool against further play-out movement through engagement of the brake. Importantly, it should be noted that, although the retractable leash assembly is locked, should the user move toward the leashed subject, or should the leashed subject move back toward the user, the spring biased spool will operate to retract and take-up the leash. Should the leashed subject thereafter attempt to move away from the user while the operating button is depressed, the retractable leash assembly will maintain its locked configuration against such movement, and any amount of the leash that had previously been taken-up will be maintained on the spool.

Should the user decide to maintain a locked configuration, the user may engage the locking button. In such configuration, the user may release hold of the operating button, and merely hold onto the handle, as provided by interoperation of the locking button with the operating button.

These and other features and advantages of the implementations of the present disclosure will become more readily apparent to those skilled in the art upon consideration of the following detailed description and accompanying drawings, which describe both the preferred and alternative implementations of the present disclosure.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION

Figure 1:
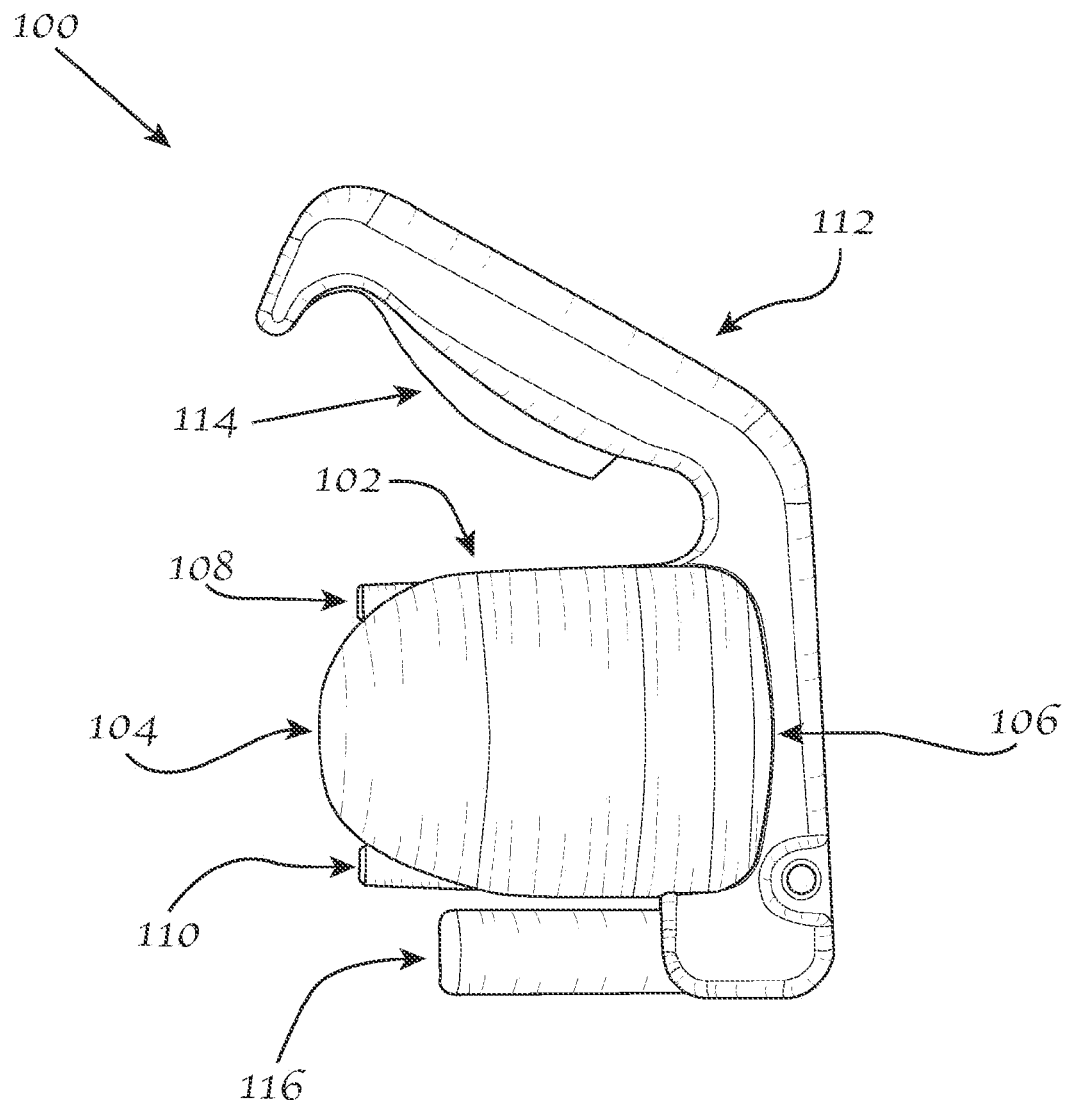
FIG. 1 is an illustration of one embodiment of the one-hand operable retractable leash.

Implementations of the present disclosure now will be described more fully hereinafter. Indeed, these implementations can be embodied in many different forms and should not be construed as limited to the implementations set forth herein; rather, these implementations are provided so that this disclosure will satisfy applicable legal requirements. As used in the specification, and in the appended claims, the singular forms "a," "an," and "the," include plural referents unless the context clearly indicates otherwise. The term "comprising" and variations thereof as used herein is used synonymously with the term "including" and variations thereof and are open, non-limiting terms.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the figures, and the detailed descriptions thereof, are to be regarded as illustrative in nature and not restrictive. Also, the reference or non-reference to a particular embodiment of the invention shall not be interpreted to limit the scope of the invention.

In describing the several embodiments illustrated in the Figures, selected terminology is employed for the sake of clarity. The various aspects of invention contained herein, however, are not intended to be limited to the terminology so selected. It should be understood that each specific element and aspect of invention described herein is intended to include all alternative and/or technical equivalents that operate in a similar manner to accomplish a similar purpose, regardless of the selected terminology used to describe each specific element or aspect.

When pet owners walk their pets, especially more than one pet, the pet owners are often required to carry more than one leash. In other situations where a leash will accommodate two pets, the leashes often become tangled as the owners walk the pets. Furthermore, when a pet owner wishes to restrict the pet's or pets' movement, the pet owner must lock the leash before manually pulling the leash toward herself, and unlocking and relocking the leash as tension decreases in the leash. The present disclosure provides apparatuses and methods for one-hand operable leash that provides for tangle-free leashes and self-winding spools. Furthermore, the present disclosure provides a leash apparatus that includes a roll-back feature, wherein the retractable leash or leashes automatically self-wind and/or roll-back as tension decreases in the leash, and then as tension increases, the spools again lock into place.

FIG. 1 is an illustration of one embodiment of the one-hand operable retractable leash. FIG. 1 shows an example one-hand operable retractable leash for leashing two subjects. This example leash 100 includes a housing 102 and a handle assembly 112. The housing 102 includes a posterior portion 106 and a curved anterior portion 104. The anterior portion 104 is configured to have a first leash opening 108 and a second leash opening 110.

Figure 2:
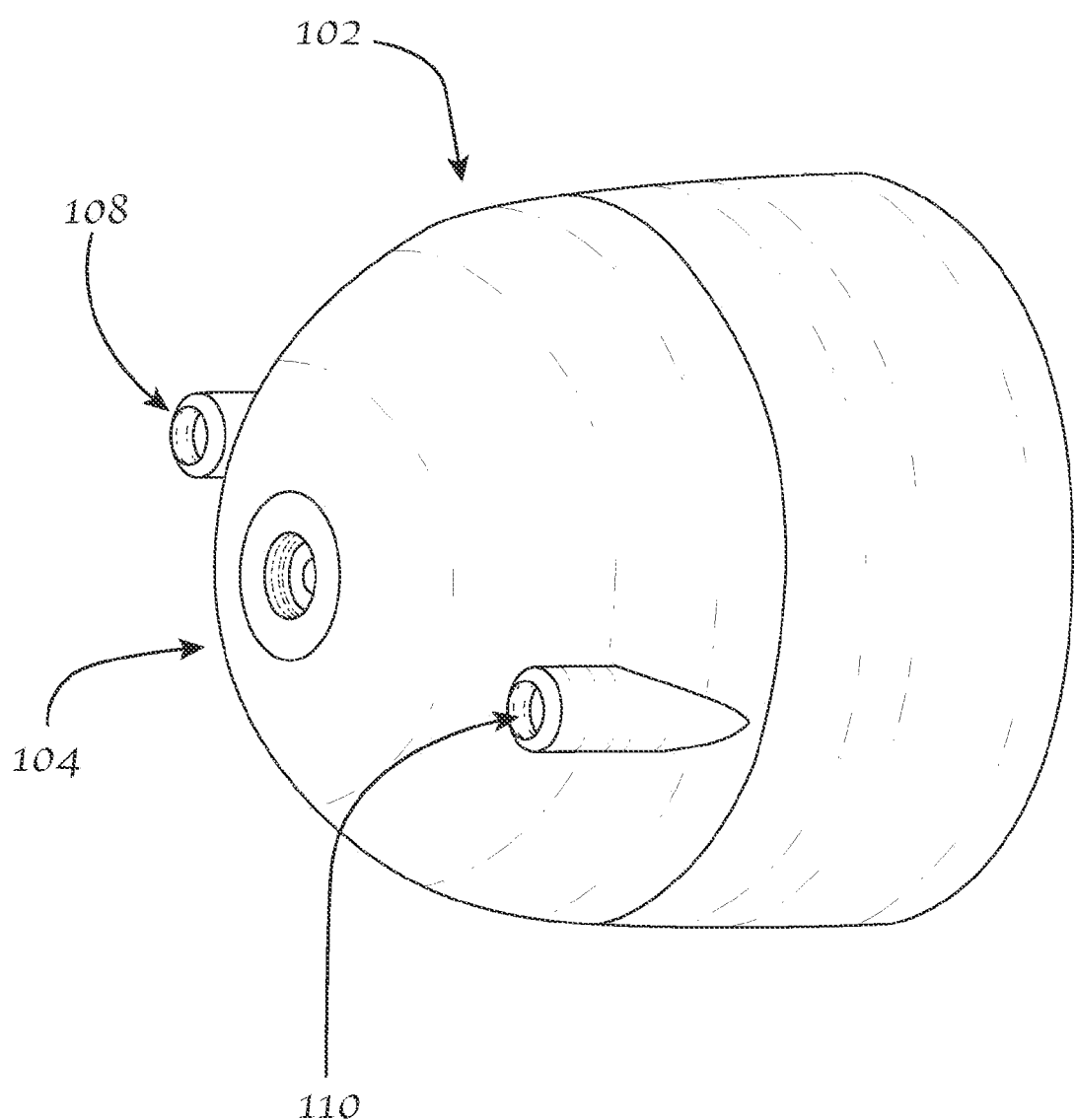
FIG. 2 is an illustration of a housing of one embodiment of the retractable leash.

FIG. 2 is an illustration of a housing of one embodiment of the retractable leash. An example housing is also shown in FIG. 2.

Referring again to FIG. 1, the handle assembly 112 further includes a lever 114. A flashlight holder 116 may optionally be provided as part of the handle assembly 112, for insertion of a flashlight (not shown) therein. The one-hand operable retractable leash apparatus also includes first and second spools 204 and 206 (shown in FIG. 6).

Figure 3:
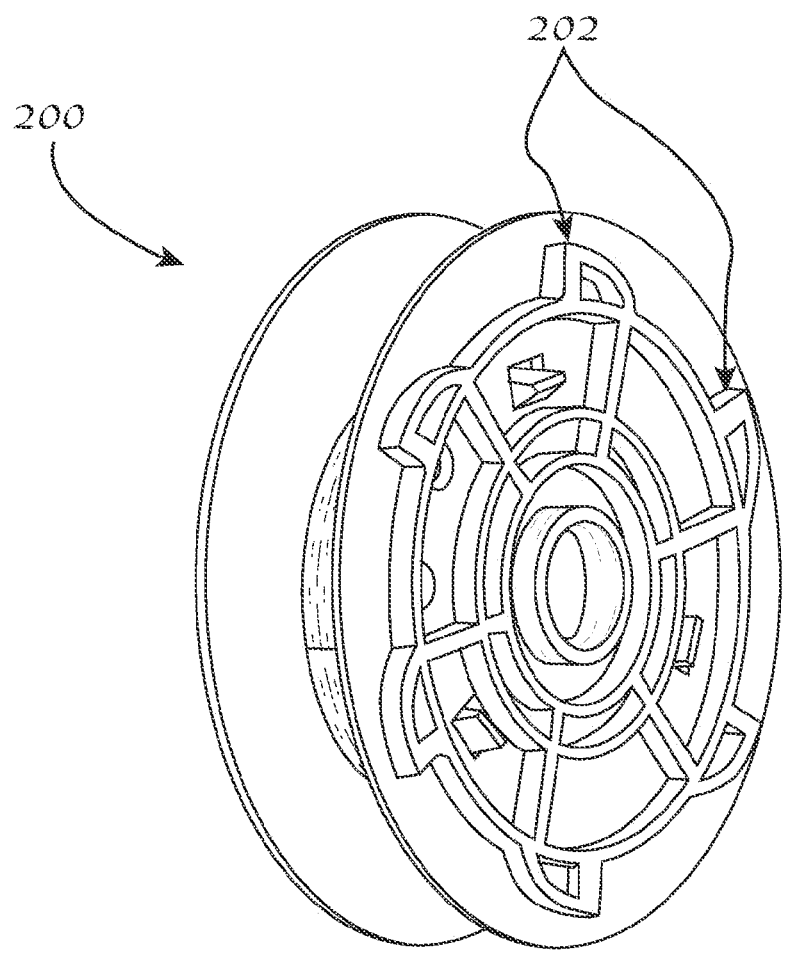
FIG. 3 is an illustration of a spool of one embodiment of the retractable leash.

FIG. 3 is an illustration of a spool of one embodiment of the retractable leash. Referring now to FIG. 3, an example spool 200 is shown. The example spool 200 also shows the plurality of braking notches 202.

Figure 4:
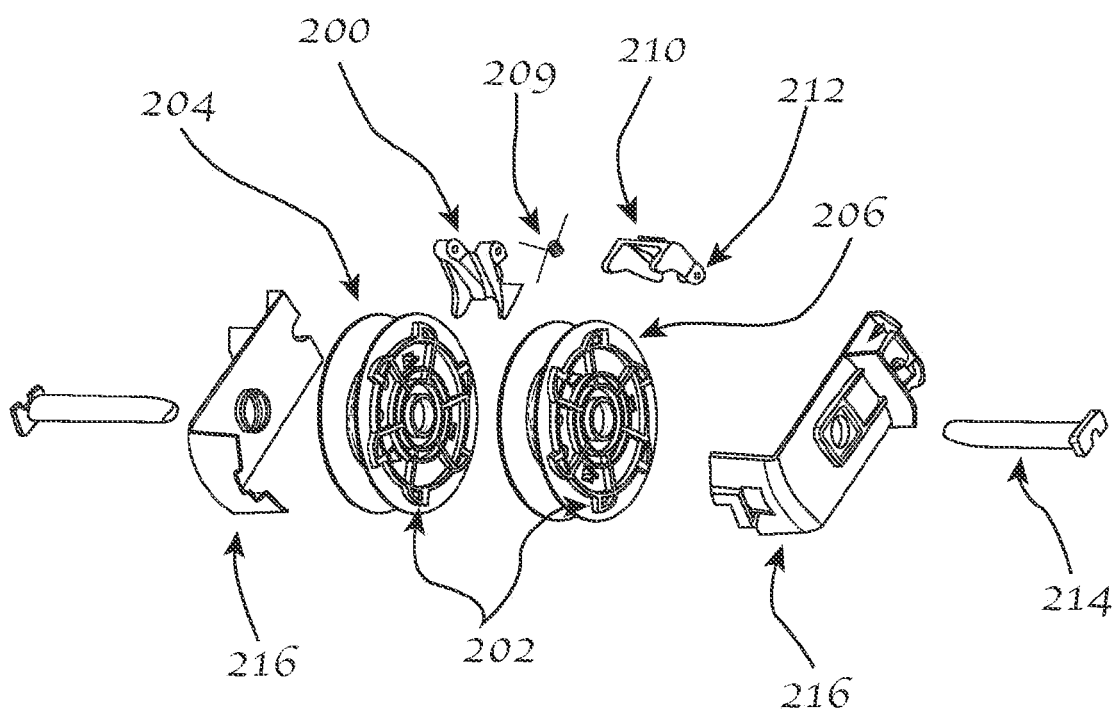
FIG. 4 is an illustration of an exploded view of a portion of one embodiment of the retractable leash.

FIG. 4 is an illustration of an exploded view of one embodiment of a portion of the retractable leash. Referring now to FIG. 4, various components of an example one-hand operable retractable leash apparatus are shown. The first and second spools 204 and 206 are rotatably connected to or attached to an axle 214. The rotation of the first and second spools 204 and 206 is independent from the axle 214. Each spool 204 or 206 rotates in a direction opposite of the direction that the other spool is rotating. The first and second spools 204 and 206 include a plurality of braking notches 202.

Figure 5:
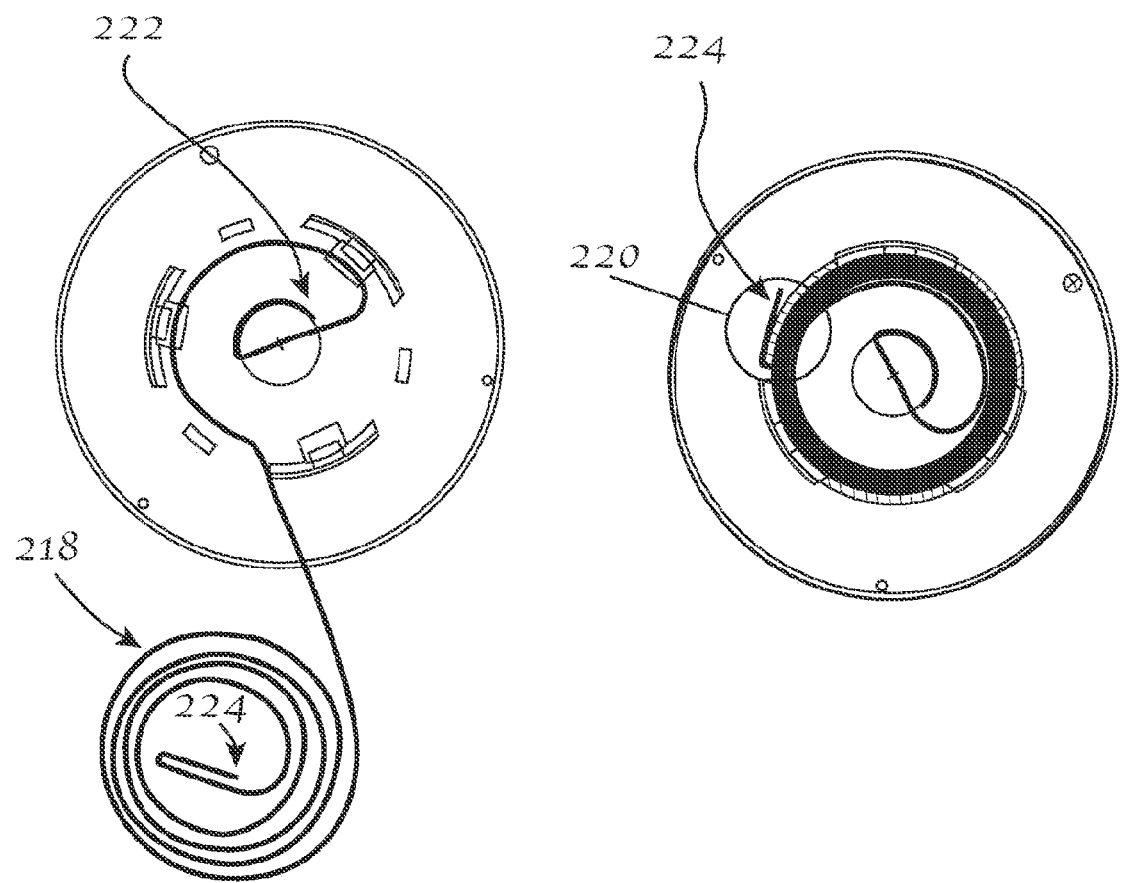
FIG. 5 is an illustration of spools and springs of one embodiment of the retractable leash.

FIG. 5 is an illustration of spools and springs of one embodiment of the retractable leash.

Referring now to FIG. 5, example springs 218 are shown in spools. The first and second spools 204 and 206 include a spring 218.

Referring again to FIG. 4, various components of a one-hand operable retractable leash are shown, including first and second brakes 208 and 210. The leash apparatus includes first and second brakes 208 and 210, and these brakes 208 and 210 are attached to a brake rod 212 and are preferably positioned such that the brakes 208 and 210 are engageable with the plurality of braking notches 202 on the spools 204 and 206. The brake rod 212 passes through the rod openings of the brakes 208 and 210 and the brake springs 209 and anchors into the handle assembly 112.

The spools 204 and 206, the axle 214, the brakes 208 and 210, and the brake rod 212 are preferably adapted to the interior portion of the housing 102. The housing 102 is adapted to connect or attach to the handle assembly 112. The curved anterior portion 104 of the housing 102 is configured to spin. The first leash opening 108 and the second leash opening 110 on the housing 102 are preferably on opposite sides of housing 102 and are optionally separated by distance, typically in the range of 1 inch to 4 inches.

Figure 6:
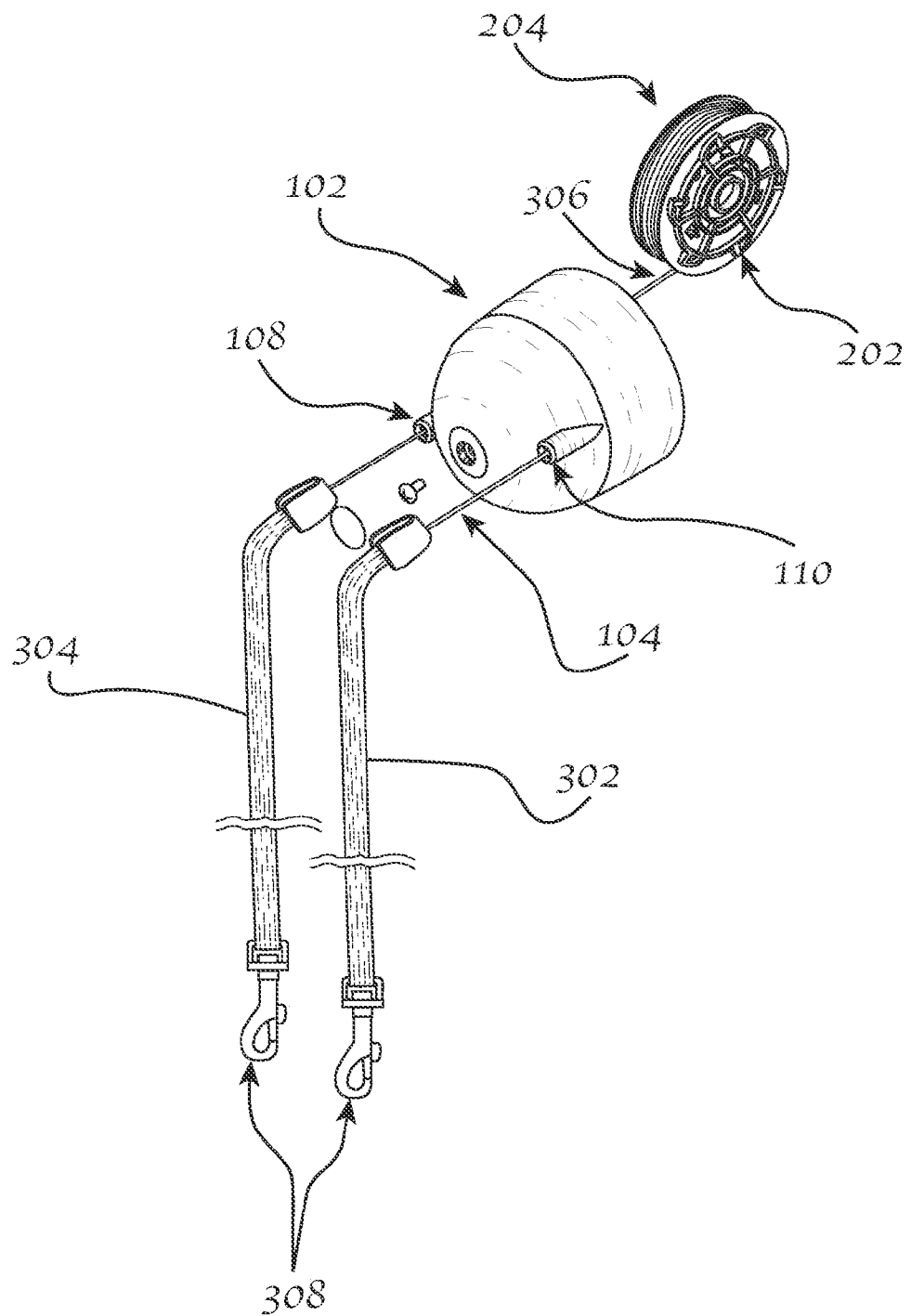
FIG. 6 is an illustration of component of one embodiment of the retractable leash.

FIG. 6 is an illustration of component of one embodiment of the retractable leash. Referring now to FIG. 6, various components of an example one-hand operable retractable leash are shown, including example retractable leashes 302 and 304. Each spool 204 and 206 may include retractable leashes 302 and 304. For example, the retractable leashes 302 and 304 may include a proximal end 306 attached to the first and second spools 204 and 206 and a distal end 308 inserted through the first and second leash openings 108 and 110 on the anterior portion 104 of the housing 102.

Figure 7:
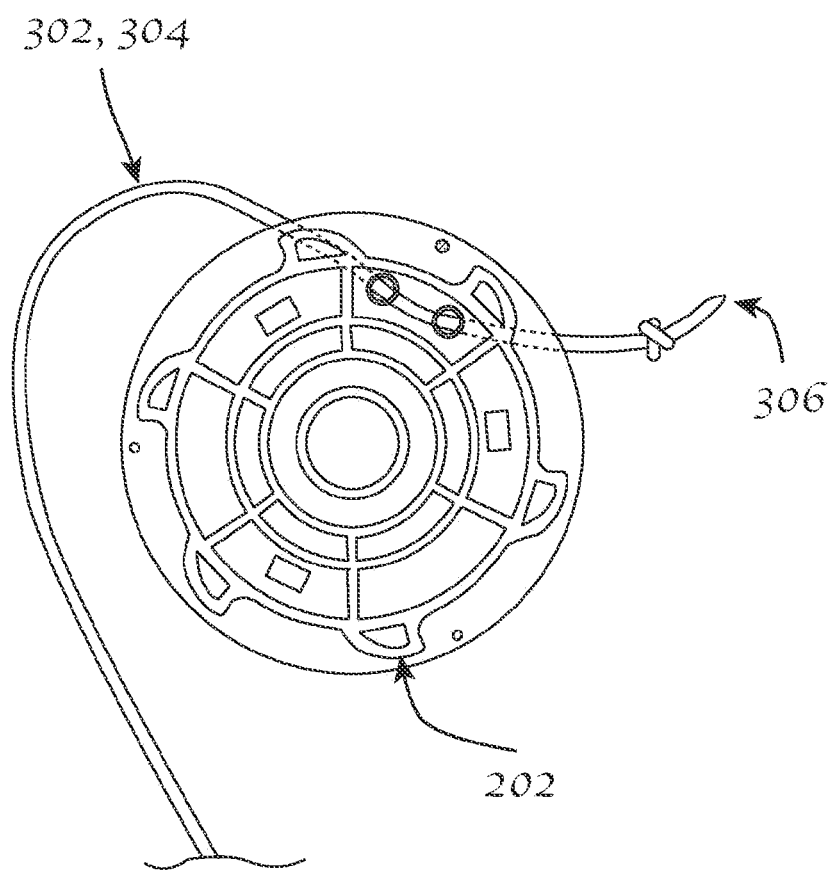
FIG. 7 is an illustration of a spool of one embodiment of the retractable leash.

FIG. 7 is an illustration of a spool of one embodiment of the retractable leash. Referring to FIG. 7, the proximal end 306 of an example retractable leash 302 and 304 is shown threaded through the spool and knotted. This knotted feature of the present disclosure helps to ensure that the proximal ends 306 and the retractable leashes 302 and 304 remain securely attached to the spools 204 and 206. Any securing mechanism may be used without deviating from the scope of the invention.

The first and second spools 204 and 206 may rotate about the axle 214 when the first and second brakes 208 and 210 are not engaged with the plurality of the braking notches 202 on the first and second spools 204 and 206. The first and second brakes 208 and 210 are optionally engaged with the plurality of braking notches 202 on the first and second spools 204 and 206, thus causing the first and second spools 204 and 206 to cease the ability to rotate about the axle 214.

Referring again to FIG. 5, example spools 204 and 206 with springs 218 are shown. The first and second spools 204 and 206 include springs 218, and these springs 218 may be constant-force springs. These constant-force springs 218 are wound opposite the direction of the tension in the springs 218, so that tension is constant within the spools 204 and 206. The proximal ends 222 of the springs 218 may be fixably connected to the inner portions of the first and second spools 204 and 206, and then these springs 218 may be wound within the inner portions of the first and second spools 204 and 206. As shown in FIG. 5, the distal ends 224 of the springs 218 may optionally be configured to include tabs 220. The tabs 220 on the distal ends 224 of the springs 218 may lock upon an opening to the inner portions of the first and second spools 204 and 206. Furthermore, the springs 218 may be positioned in a first position where the first and second retractable leashes 302 and 304 are fully wound on each of the first and second spools. For example, spring 218 may be disengaged from its first position where a force is exerted to withdraw the retractable leashes 302 and 304 from the housing 102, thereby rotating the spools 204 and 206. The spring 218 may return to its first position where the force is ceased, thereby rewinding the retractable leashes 302 and 304 about the spools 204 and 206.

Figure 8:
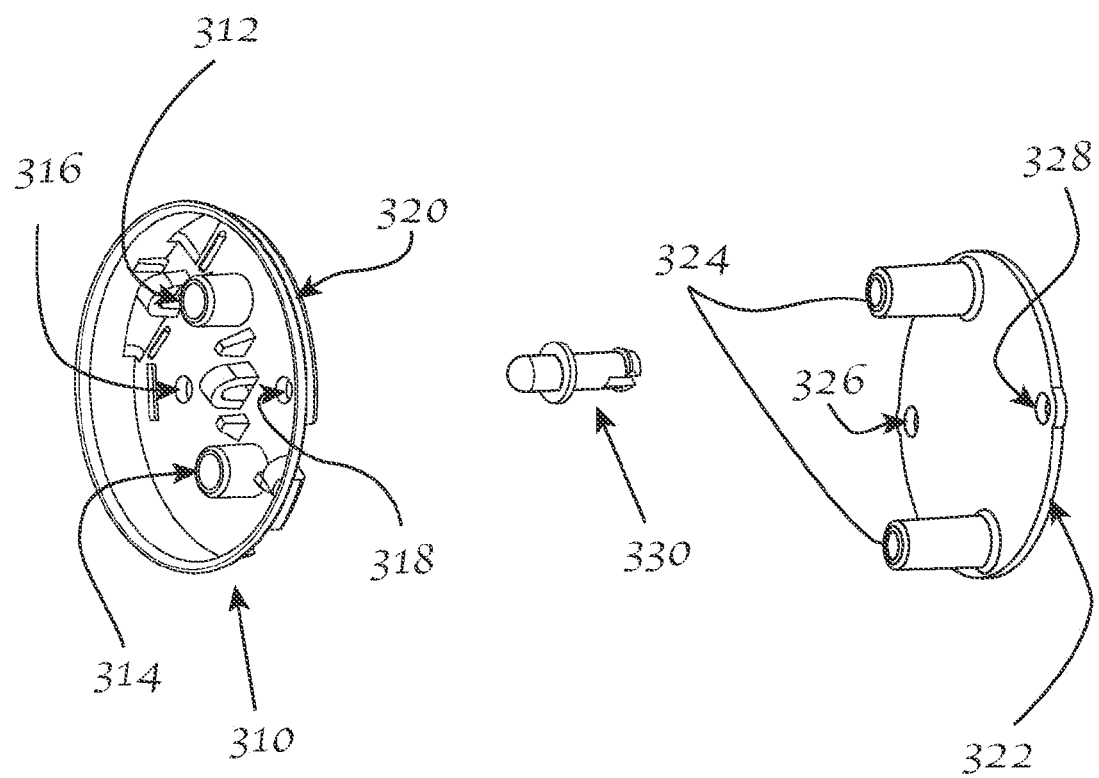
FIG. 8 is an illustration of a braking plate, plunger, and stop disk plate, of one embodiment of the retractable leash.

FIG. 8 is an illustration of a braking plate, plunger, and stop disk plate, of one embodiment of the retractable leash. Referring now to FIG. 8, an example braking plate, plunger, and stop disk are shown. The first and second brakes 208 and 210, the first and second brake springs 209, and the brake rod 212 may optionally attach to a braking plate 310. For example, the braking plate 310 may include first, second, third, and fourth openings 312, 314, 316, and 318. A stop disk 322 may engage the posterior 320 of the braking plate 310. For example, the stop disk 322 may include two protrusions 324 for insertion into the first and second openings 312 and 314 on the braking plate 310. Furthermore, the stop disk 322 may include first and second holes 326 and 328 for insertion of the first and second plungers 330 therethrough.

Figure 9:
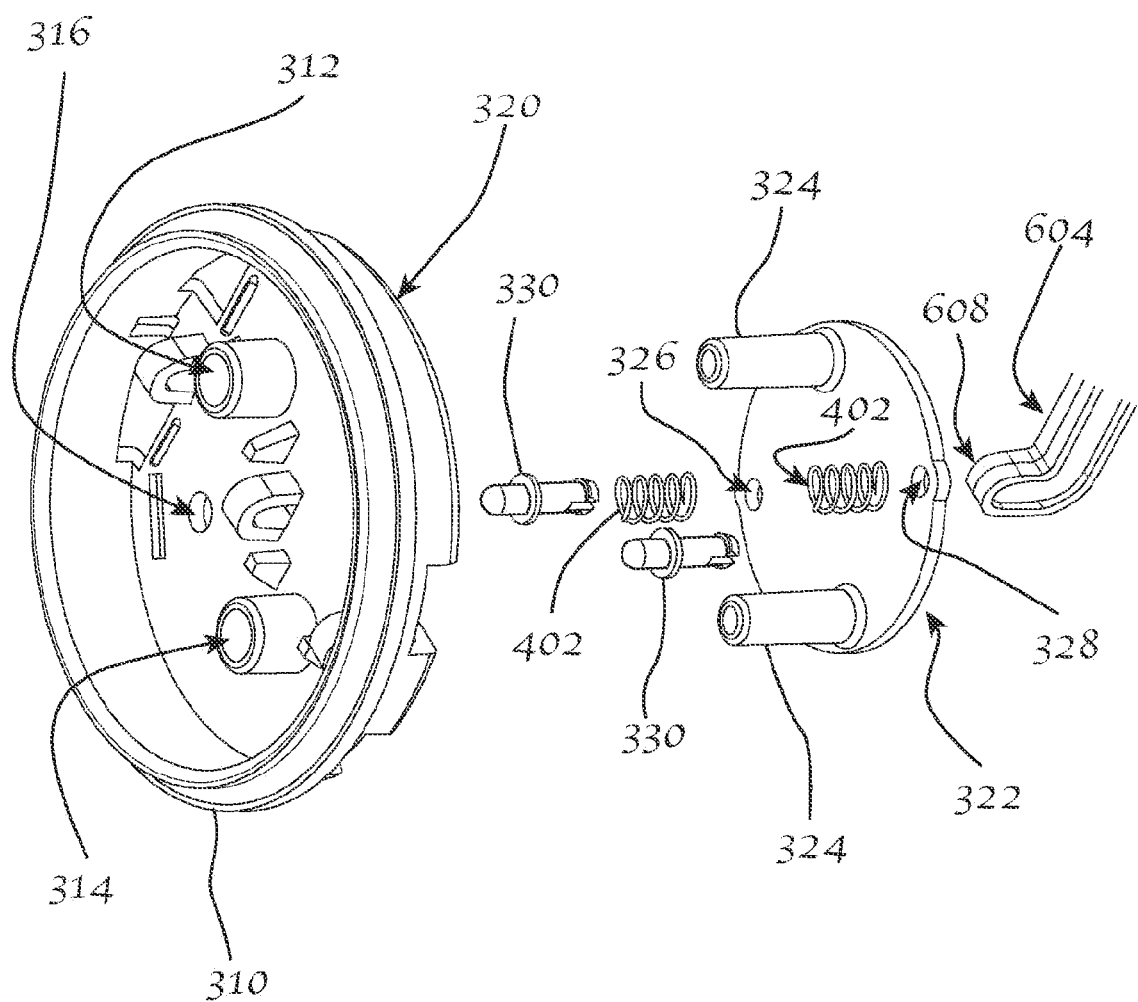
FIG. 9 is an illustration of another braking plate, plunger, and stop disk plate, of one embodiment of the retractable leash.

FIG. 9 is an illustration of another braking plate, plunger, and stop disk plate, of one embodiment of the retractable leash. Referring now to FIG. 9, an example braking plate, plunger, plunger spring, and stop disk are shown. Optionally, plunger springs 402 are included about the first and second plungers 330 and between the stop disk 322 and the braking plate 310. The plunger springs 402 are optionally in a first position where the plunger springs 402 are not compressed and the stop disk 322 and braking plate 310 are separated by a maximum distance. For example, the plunger springs 402 are adapted to conform toward the first position. The plunger springs 402 are optionally in a second position where the plunger springs 402 are compressed and the stop disk plate 322 and braking plate 310 are separated by a distance less than the maximum distance. The plungers 330 optionally contact the first and second 208 and 210 when the plunger springs 402 are in the second position. Typically, the stop disk moves less than an inch (approximately 0.130 inches to 0.140 inches) from its rest position to its actuated position when the lever 114 is fully engaged. Similarly the plungers 330 preferably move less than an inch (approximately 0.020 inches to 0.140 inches).

Figure 10:
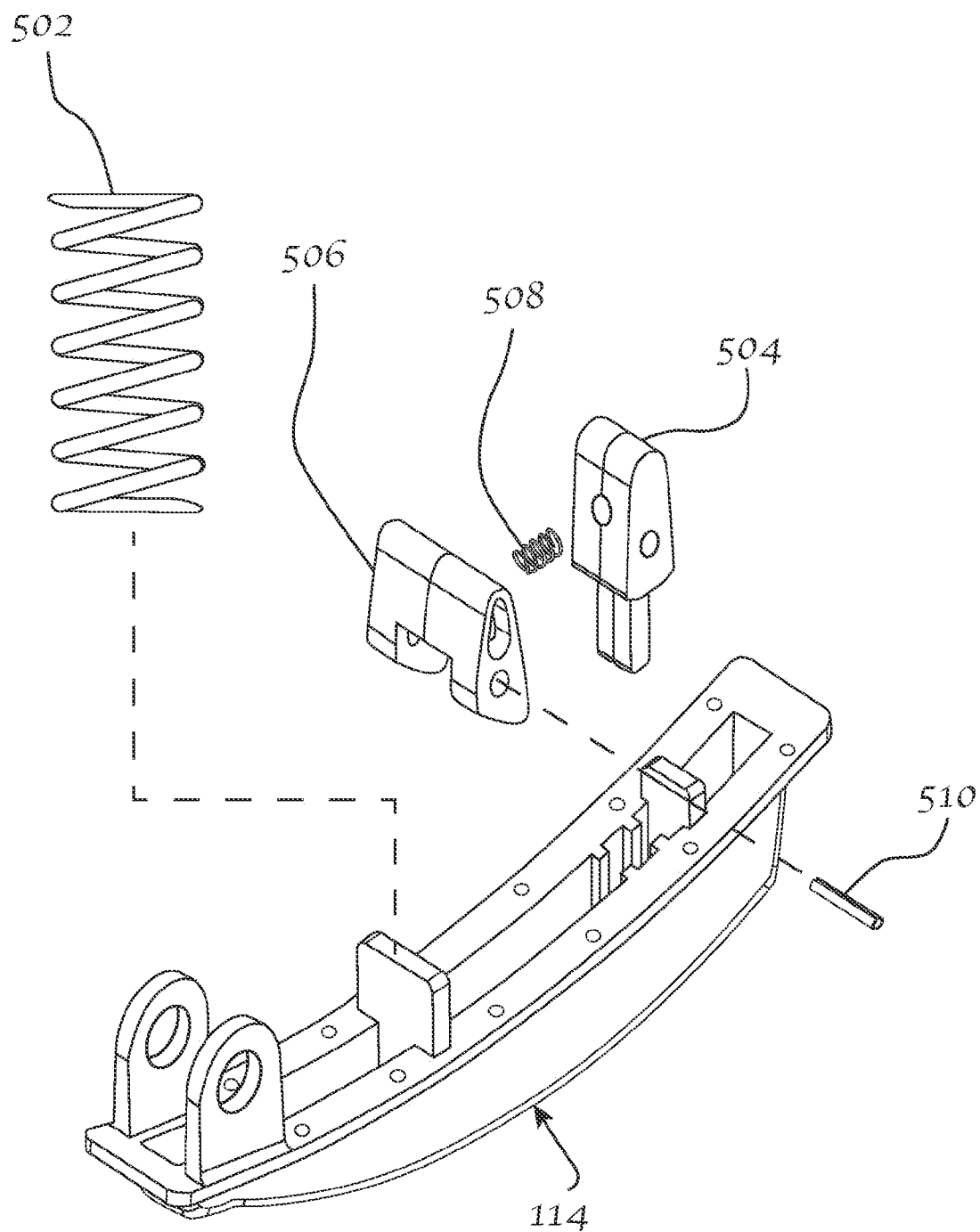
FIG. 10 is an illustration of a lever and various lever components of one embodiment of the retractable leash.

FIG. 10 is an illustration of a lever and various lever components of one embodiment of the retractable leash. Referring to FIG. 10, an example lever is shown. The lever 114 may move between a first position and a second position. For example, the lever 114 may include a lever spring 502 between the lever 114 and the handle assembly 112. The lever spring 502 may be in a first position where the lever spring 502 is compressed. The lever 114 may also include an actuator 504 and a release cam 506. Another embodiment of the present disclosure may include a button or plurality of buttons in lieu of a lever. The brake is released by allowing the lever to move from a second position to a first position and then moving the lever about halfway between the first and second positions.

Figure 11:
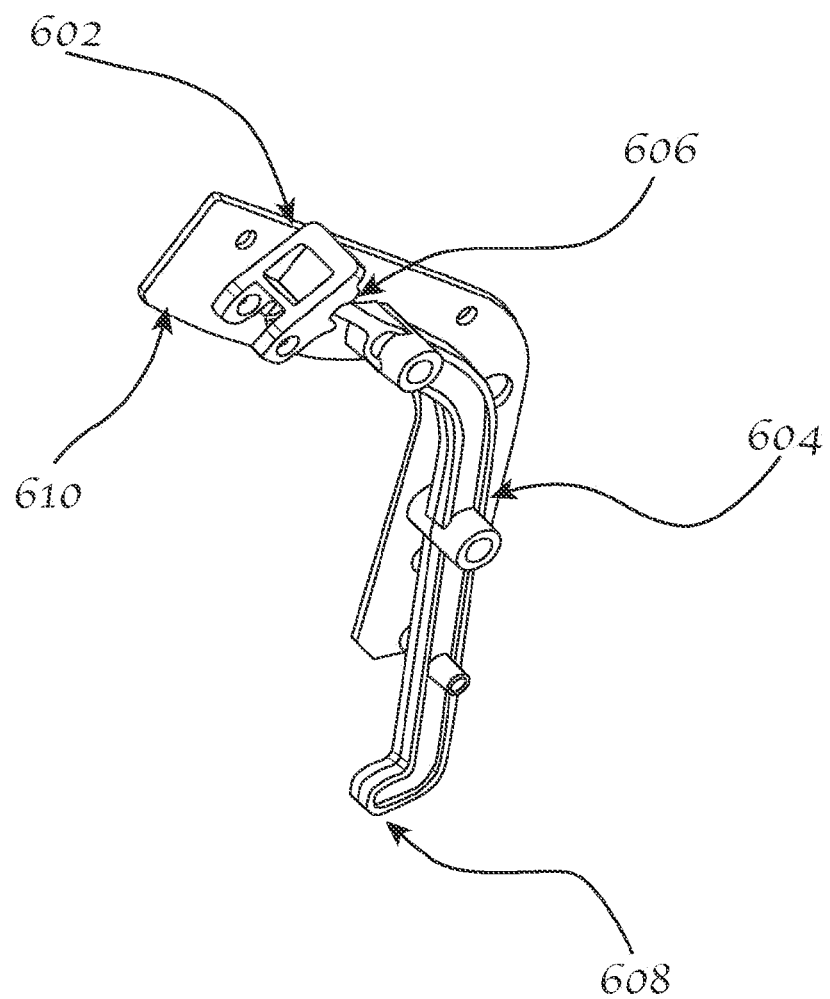
FIG. 11 is an illustration of a actuator arm, stiffener, and catch of one embodiment of the retractable leash.

FIG. 11 is an illustration of an actuator arm, stiffener, and catch of one embodiment of the retractable leash. An example actuator arm and catch are shown in FIG. 11. The lever 114 may also include a catch 602. An actuator arm 604 may also connectably attach to the handle assembly 112. The actuator arm 604 includes a proximal end 606 and a distal end 608.

Figure 12:
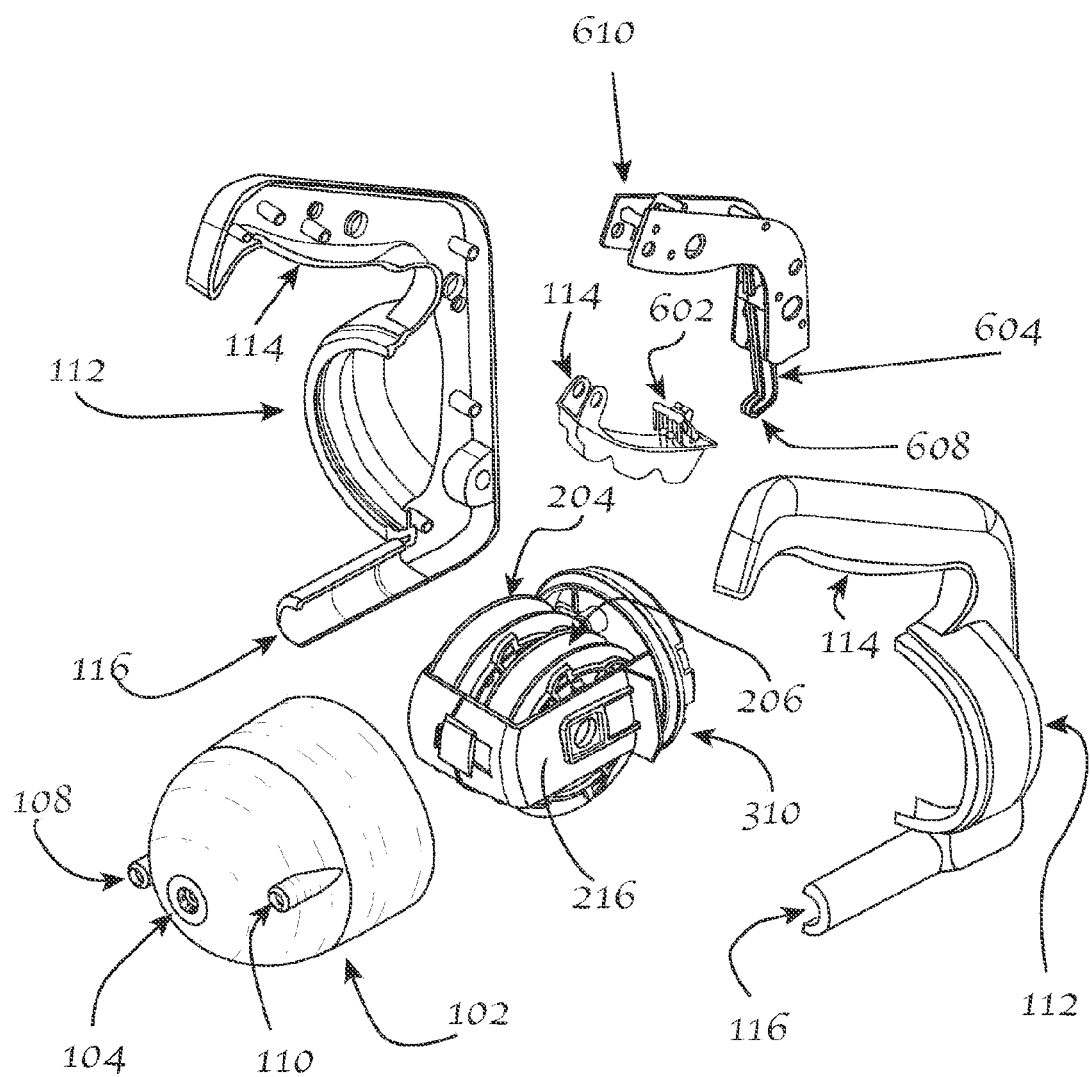
FIG. 12 is an illustration of one embodiment of the one-hand operable retractable leash.

FIG. 12 is an illustration of an exploded view of one embodiment of the one-hand operable retractable leash. FIG. 12 shows that the leash preferably includes a separator 216. As shown in FIG. 12, the separator 216 has two leash apertures. Separator 216 prevents the leashes that are wrapped around the spools 204 and 206 from becoming entangled inside housing 102.

FIGS. 13-16 show example one-hand operable retractable leash apparatuses in various stages of locked and unlocked positions.

Figure 13:
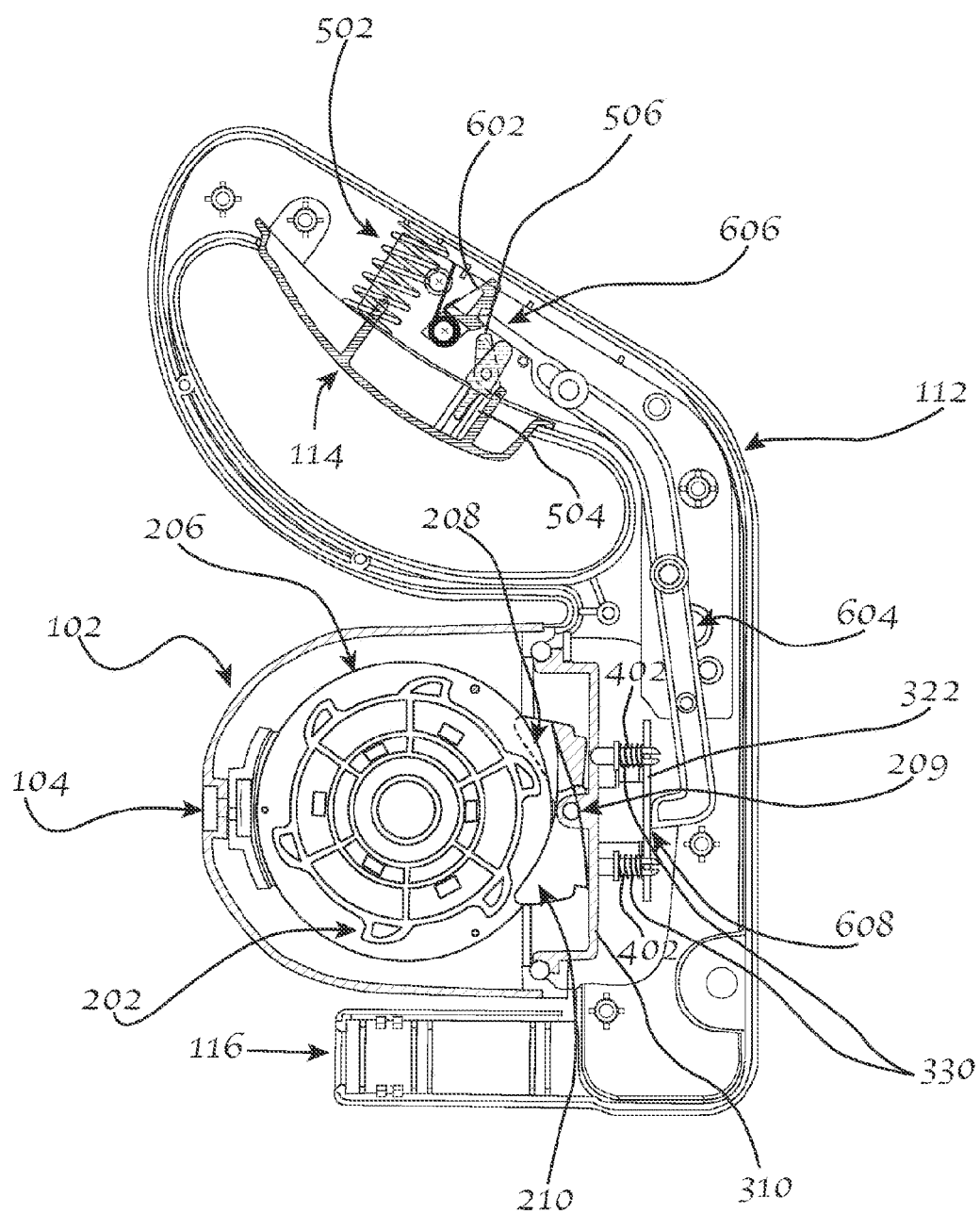
FIG. 13 a cross-section illustration of one embodiment of the retractable leash in one stage of locking and unlocking the spooling of the leash.

FIG. 13 a cross-section illustration of one embodiment of the retractable leash in one stage of locking and unlocking the spooling of the leash. FIG. 13 shows an example leash apparatus in the free spooling arrangement.

Figure 14:
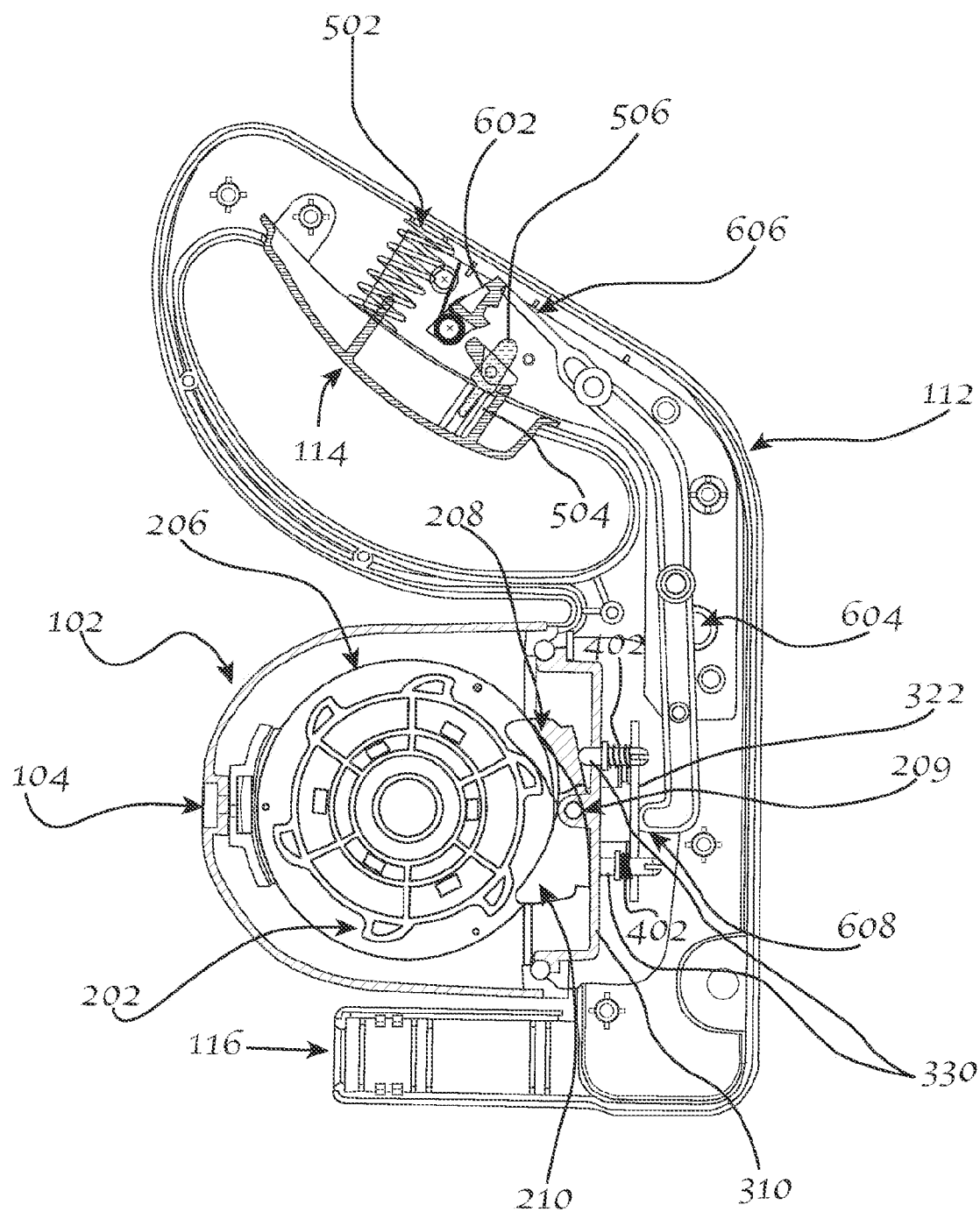
FIG. 14 a cross-section illustration of one embodiment of the retractable leash in another stage of locking and unlocking the spooling of the leash.

FIG. 14 a cross-section illustration of one embodiment of the retractable leash in another stage of locking and unlocking the spooling of the leash. FIG. 14 shows an example leash apparatus in the locked position.

Figure 15:
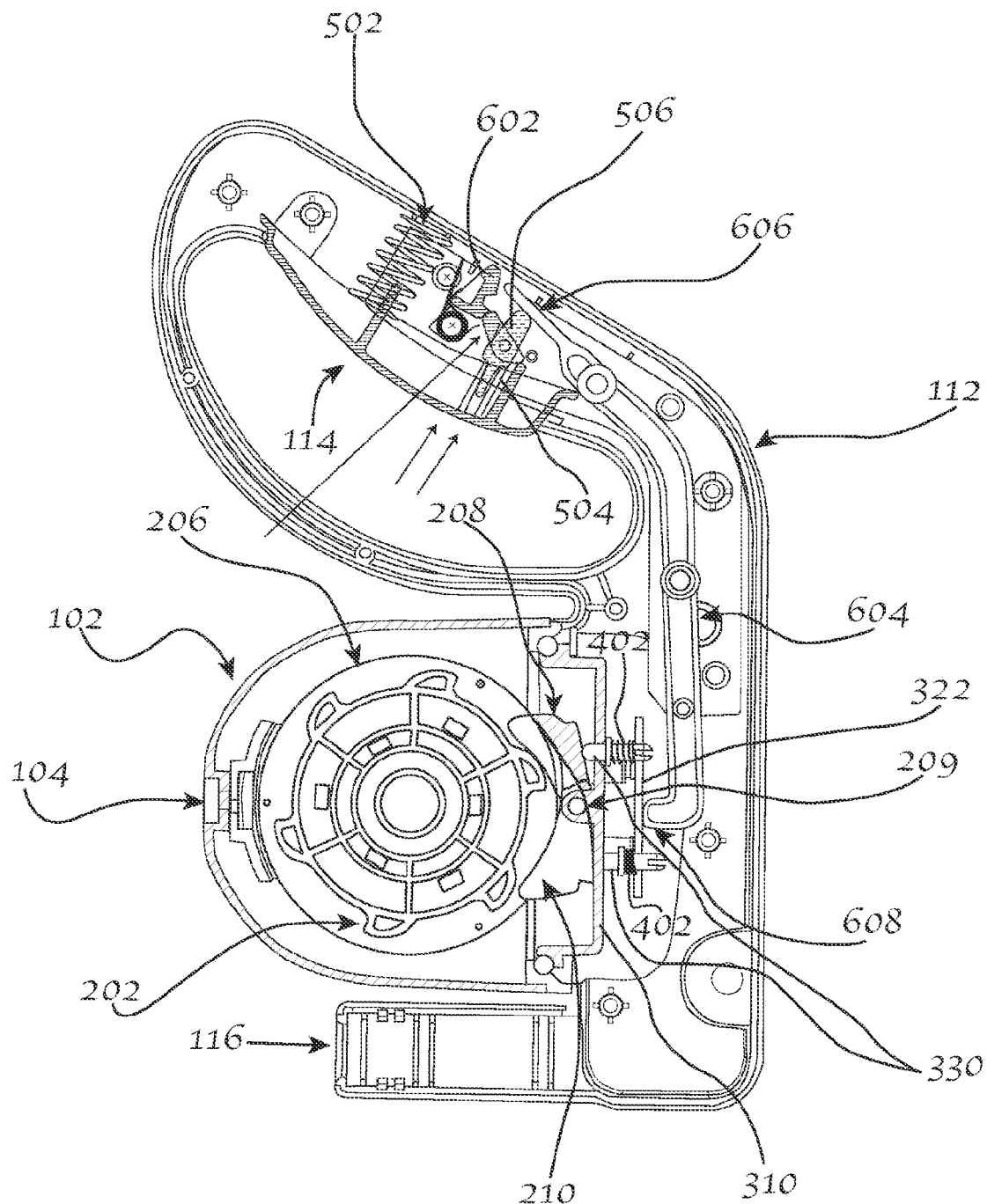
FIG. 15 a cross-section illustration of one embodiment of the retractable leash in another stage of locking and unlocking the spooling of the leash.

FIG. 15 a cross-section illustration of one embodiment of the retractable leash in another stage of locking and unlocking the spooling of the leash. FIG. 15 shows an example leash apparatus in the initial stages of being unlocked.

Figure 16:
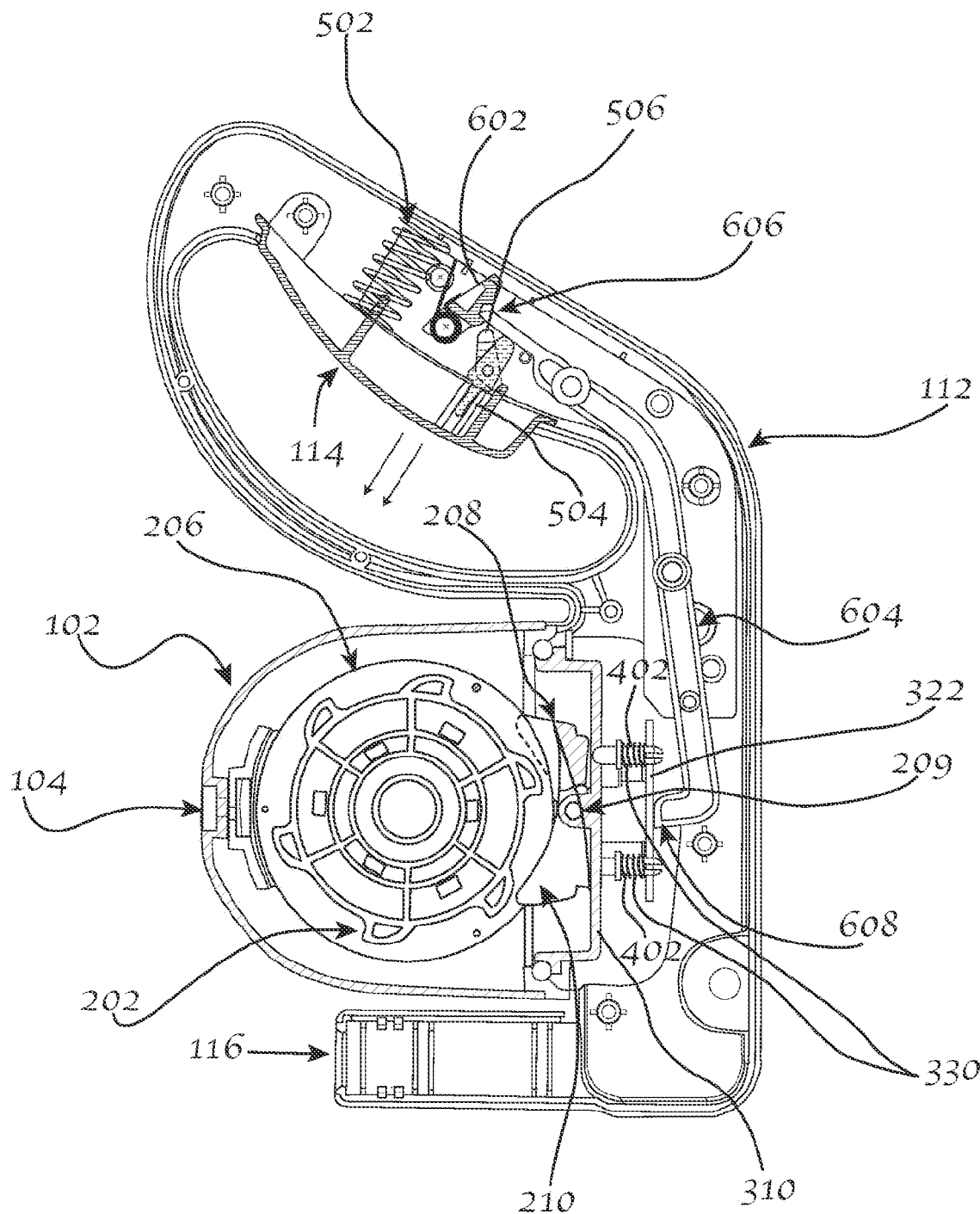
FIG. 16 a cross-section illustration of one embodiment of the retractable leash in another stage of locking and unlocking the spooling of the leash.

FIG. 16 a cross-section illustration of one embodiment of the retractable leash in another stage of locking and unlocking the spooling of the leash. FIG. 16 shows an example leash apparatus in the latter stages of being unlocked.

Referring to FIGS. 13-16, the proximal end 606 of the actuator arm 604 may engage the actuator 504, and the distal end 608 may engage the stop disk 322. For example, the lever spring 502 may move to the second position, and the actuator 504 may engage the proximal end 606 of the actuator arm 604. The distal end 608 may then engage the stop disk 322, and the plunger springs 402 may move into the second position. A catch 602 may optionally engage the proximal end 606 of the actuator arm 604, holding the proximal end 606 of the actuator arm 604 in a position such that the plunger springs 402 maintain the second position. Where the plunger springs 402 are in the second position, the plungers 330 may contact the first and second brakes 208 and 210. The first and second brakes 208 and 210 may then subsequently engage one of the plurality of braking notches 202 on the first and second spools 204 and 206.

Where the lever spring 502 is in a second position, the actuator 504 may engage. Where the actuator 504 is optionally engaged, the first and second brakes 208 and 210 may lock on each spool 204 and 206. Thus, further tension will optionally not allow unwinding of the retractable leashes 302 and 304. The catch 602 may engage the proximal end 606 of the actuator arm 604 in a position such that the plunger springs 402 maintain the second position. The release cam 506 may disengage the catch 602. Where the release cam 506 disengages the catch 602, the plunger springs 402 may return to the first position. For example, disengagement of the actuator 504 may allow the spools 204 and 206 to freely rotate. Furthermore, a release in tension in the retractable leashes 302 and 304 may allow the retractable leashes 302 and 304 to rewind on the spools 204 and 206. Where the retractable leashes 302 and 304 rewind on the spools 204 and 206 may engage the first and second brakes 208 and 210 with one of the plurality of braking notches 202 on the first and second spools 204 and 206. Typically the brakes are locked by moving the lever into the second position. The brakes are unlocked by allowing the lever to return to the first position and then moving the lever approximately halfway between the first and second positions.

The example one-hand operable retractable leash apparatus may optionally include three or more retractable leashes and corresponding components.

Another embodiment of the present disclosure includes a one-hand operable retractable leash apparatus. The example one-hand operable retractable leash apparatus allows a user to set or program a leash length. The leash apparatus may allow the leashed subjects to travel the preset leash length. Once at the preset leashed length, the leash apparatus may lock in position and not allow further tension on the retractable leashes to extend the retractable leashes. Where tension on the retractable leashes decreases, the self-winding spools will rewind the leash onto the spools. The leashed subjects may increase tension in the retractable leashes and unwind the retractable leashes when the leash length is less than the preset length. Once the leash length reaches the preset length, the brakes will engage the spools and again lock the spools at the specified length.

Another embodiment of the present disclosure includes a one-hand operable retractable leash apparatus for a single leashed subject. This one-hand operable retractable leash apparatus for a single leashed subject may optionally include a roll-back feature for walking a single subject. The example one-hand operable retractable leash apparatus includes a housing, a handle assembly, a spool, and a brake. The housing includes a posterior portion and an anterior portion. The anterior portion is configured to have a leash opening. The handle assembly further includes a lever.

The spool of the leash apparatus is rotatably connected to or attached to an axle, and the rotation of the spool is independent from the axle. The spool includes a spring and a plurality of braking notches. The leash apparatus also includes a brake, and this brake is attached to a brake rod and is positioned such that the brake is engageable with the plurality of braking notches on the spool. The brake rod passes through the rod opening of the brake and the brake spring and anchors into the handle assembly.

The spool, the axle, the brake, and the brake rod are adapted to the interior portion of the housing. The housing is adapted to connect or attach to the handle assembly. The brake, the brake spring, and the brake rod may optionally attach to a braking plate. For example, the braking plate may include first and second openings. A stop disk may engage the posterior of the braking plate. For example, the stop disk may include a protrusion for insertion into the first opening on the braking plate. Furthermore, the stop disk plate may include a hole for insertion of a plunger therethrough. Optionally, a plunger spring is included about the plunger and between the stop disk plate and the braking plate.

The plunger spring is optionally in a first position where the plunger spring is not compressed and the stop disk plate and braking plate are separated by a maximum distance. For example, the plunger spring is adapted to conform toward the first position. The plunger spring is optionally in a second position where the plunger spring is compressed and the stop disk plate and braking plate are separated by a distance less than the maximum distance. The plunger optionally contacts the brake when the plunger spring is in the second position.

The lever on the example one-hand operable retractable leash apparatus may move between a first position and a second position. For example, the lever may include a lever spring between the lever and the handle assembly. The lever spring may be in a first position where the lever spring is not compressed. Furthermore, the lever spring may be in a second position where the lever spring is compressed. The lever may also include an actuator and a release cam. The lever may also include a catch.

An actuator arm may also connectably attach to the handle assembly. The actuator arm includes a proximal end and a distal end. The proximal end of the actuator arm may engage the actuator, and the distal end may engage the stop disk plate. For example, the lever spring may move to the second position, and the actuator may engage the proximal end of the actuator arm. The distal end may then engage the stop disk plate, and the plunger springs may move into the second position. A catch may optionally engage the proximal end of the actuator arm, holding the proximal end of the actuator arm in a position such that the plunger spring maintains the second position. Where the plunger spring is in the second position, the plunger may contact the brake. The brake may then subsequently engage one of the plurality of braking notches on the spool.

Where the lever spring is in a second position, the actuator may engage. Where the actuator is optionally engaged, the brake may lock on the spool. Thus, further tension will optionally not allow unwinding of the retractable leash. The catch may engage the proximal end of the actuator arm in a position such that the plunger springs maintains the second position. The release cam may disengage the catch. Where the release cam disengages the catch, the plunger spring may return to the first position. For example, disengagement of the actuator may allow the spool to freely rotate. Furthermore, a release in tension in the retractable leash may allow the retractable leash to rewind on the spool. Where the retractable leash rewinds on the spool, tension in the retractable leash may engage the brake with one of the plurality of braking notches on the spool.

Also provided is a method for walking two leashed subjects. Example methods are illustrated in FIGS. 13-16.

Figure 17:
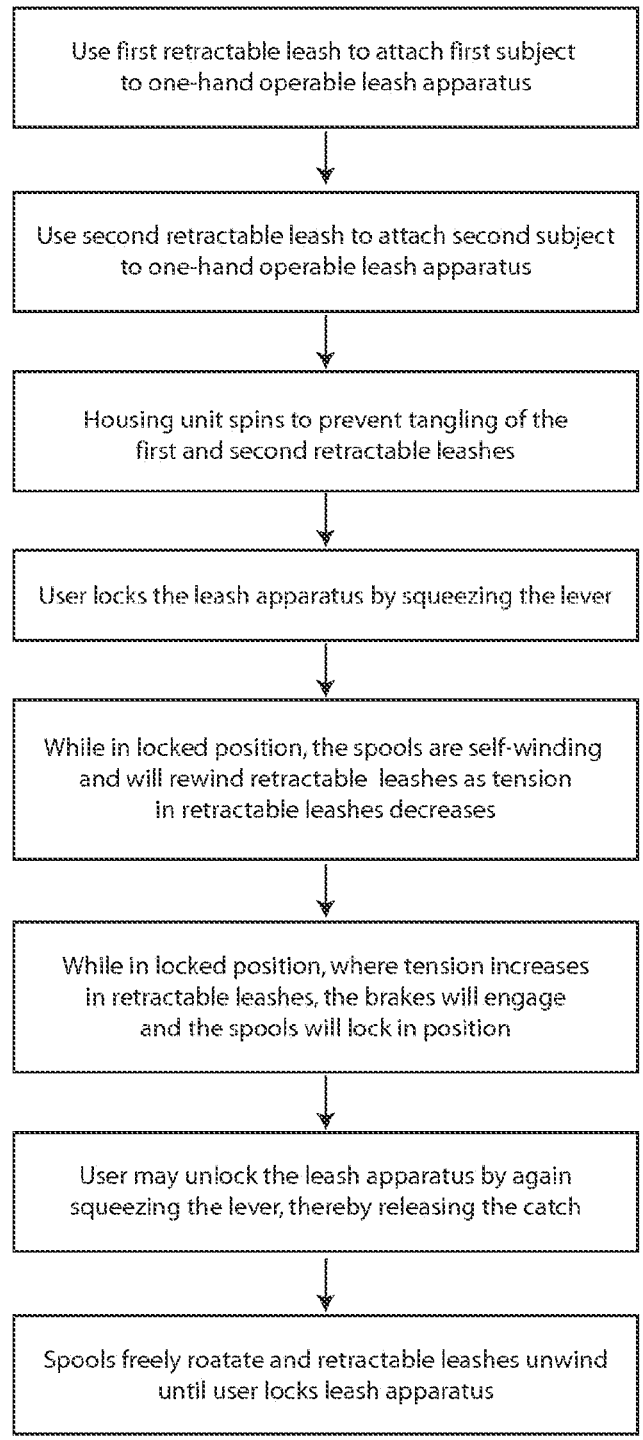
FIG. 17 is a flow chart of one embodiment of the method for walking two leashed subjects using the retractable leash.

FIG. 17 is a flow chart of one embodiment of the method for walking two leashed subjects using the retractable leash. A flow chart for an example method for walking two leashed subjects is also provided in FIG. 17. The method includes attaching a first subject with a first retractable leash 302, and then attaching a second subject with a second retractable leash 304. The first and second retractable leashes 302 and 304 are positioned through leash openings 108 and 110 on a rotating housing 102, and the first and second retractable leashes 302 and 304 are configured to wind on self-winding spools 204 and 206.

The rotating housing 102 may spin according to movement of the subjects to prevent tangling of the retractable leashes 302 and 304. The user may lock the position of the retractable leashes 302 and 304 by squeezing a lever 114. For example, the spools 204 and 206 are self-winding, and the retractable leashes 302 and 304 are configured to rewind on the spools 204 and 206 where the tension in the retractable leashes 302 and 304 decreases. The brakes may optionally engage the spools 204 and 206 and cease rotation of the spools 206 and 206 where tension in the retractable leashes 302 and 304 increases. The user may unlock the position of the retractable leashes 302 and 304 by squeezing the lever 114, thereby releasing the catch 602.

Turning now to FIGS. 18-22, an alternative embodiment of a retractable leash assembly for a single leash subject is shown. Retractable leash assembly 800 for a single leash subject may be seen to share aspects operably similar to those disclosed within those embodiments depicted in FIGS. 1-17; and, most specifically, those aspects providing and allowing for self-winding of a retractable lead associated with a spool thereof, without regard to whether or not an associated brake is engaged. Like the embodiments depicted within FIGS. 1-17, retractable leash assembly 800 for a single leash subject is intended for one handed operation by a user thereof.

Accordingly, a user may grasp retractable leash assembly 800 at handle H. Handle H may, of course, take various forms, including, but not limited to, such forms as have been depicted within the disclosure hereof.

Leash 802 (also known in the art as a lead or tether) associated with spool 804 may be attached to spool 804 in a manner similar to that described in detail hereinabove with regard to FIG. 7. As well, spool 804 may be rotationally biased within housing 806 by operation of associated spring 218, as has been described in detail hereinabove with regard to FIG. 5. Leash 802 may be constrained in its motion, using stop means and details of construction well-known in the art, so that a fixed length remains outside of housing 806. As well, leash 802 may be constrained by housing 806 and associated components and details of construction well-known in the art, so that leash 802 spools out and retracts smoothly during operation.

Like spool 200 depicted within FIG. 3, spool 804 is provided with a plurality of braking notches 808. Pawl clearance areas 810 are provided between braking notches 808, the purpose of pawl clearance areas 810 to be explained in greater detail hereinbelow.

Retractable leash assembly 800 is further provided with brake 812 having pawls 814. Pawls 814 are configured so as to be cooperatively operable at one end thereof with spool 804, pawl clearance areas 810, braking notches 808, and cam surfaces 816.

Brake 812 is further configured so as to be captured by, and cooperatively operable with, operating button 818. Operating button 818 is configured so as to be cooperatively and interoperably associated with locking button 820. Operating button 818 and locking button 820 are configured to be retained in relative position by housing 806.

Perhaps best seen with reference to FIGS. 22A-22D, operating button 818 retains transverse pin 822. In association with operating button 818, transverse pin 822 secures pawls 814 in position sufficient for spanning spool 804. Torsional spring 824 is retained within operating button 818 by transverse pin 822 running centrally therethrough. One end of torsional spring 824 is configured to bear against an internal portion of operating button 818. A second end of torsional spring 824 is configured to bear against transverse pin 826, which is also retained by brake 812. Transverse pin 826 further aids in securing and maintaining pawls 814 in the above described configuration in association with brake 812. In such configuration, torsional spring 824 serves to bias brake 812 into an appropriate position for interaction with spool 804, pawl clearance areas 810, braking notches 808, and cam surfaces 816, as will be more fully described hereinbelow.

When operating button 818 is not engaged (depressed) by a user, it is held in an outwardly biased, neutral position by operation of spring 828. Spring 828 bears at one end against an internal surface of operating button 818, and at the other end against shoulder pin 830. When operating button 818 is depressed by a user, spring 828 compresses, and such compression acts to bias operating button 818 outwardly with respect to housing 806 and toward its neutral position.

Operating button 818 is further configured to provide bearing surface 832, which may take the form of an externally molded shoulder, or the like. Locking button 820 is provided with abutment surface 834, which, when locking button 820 is engaged by a user, is urged into contact with bearing surface 832, and which acts to hold operating button 818 in its downward-most position with respect to housing 806. This, of course, serves to hold spring 828 in a compressed configuration with respect to operating button 818.

Once operating button 818 has been depressed by user action, and as locking button 820 is urged into a locked configuration by further user action, extension 836 cams along inner wall 838, which carries wall cam surface 840. Abutment surface 834 is, thereby, urged into contact with bearing surface 832. Force exerted by abutment surface 834 against housing 806 and bearing surface 832 enables locking button 820 to maintain operating button 818 in its locked, downward-most position. User disengagement of locking button 820 allows extension 836 to disengage from wall cam surface 840, biasing locking button 820 to unlocked configuration. The user may thereafter allow operating button 818 to return to its neutral position, assisted by the aforedescribed operation of spring 828.

We will now turn to those aspects of the present disclosure providing and allowing for self-winding of retractable leash 802 associated with spool 804 thereof, without regard to whether or not associated brake 812 is engaged.

Figure 18:
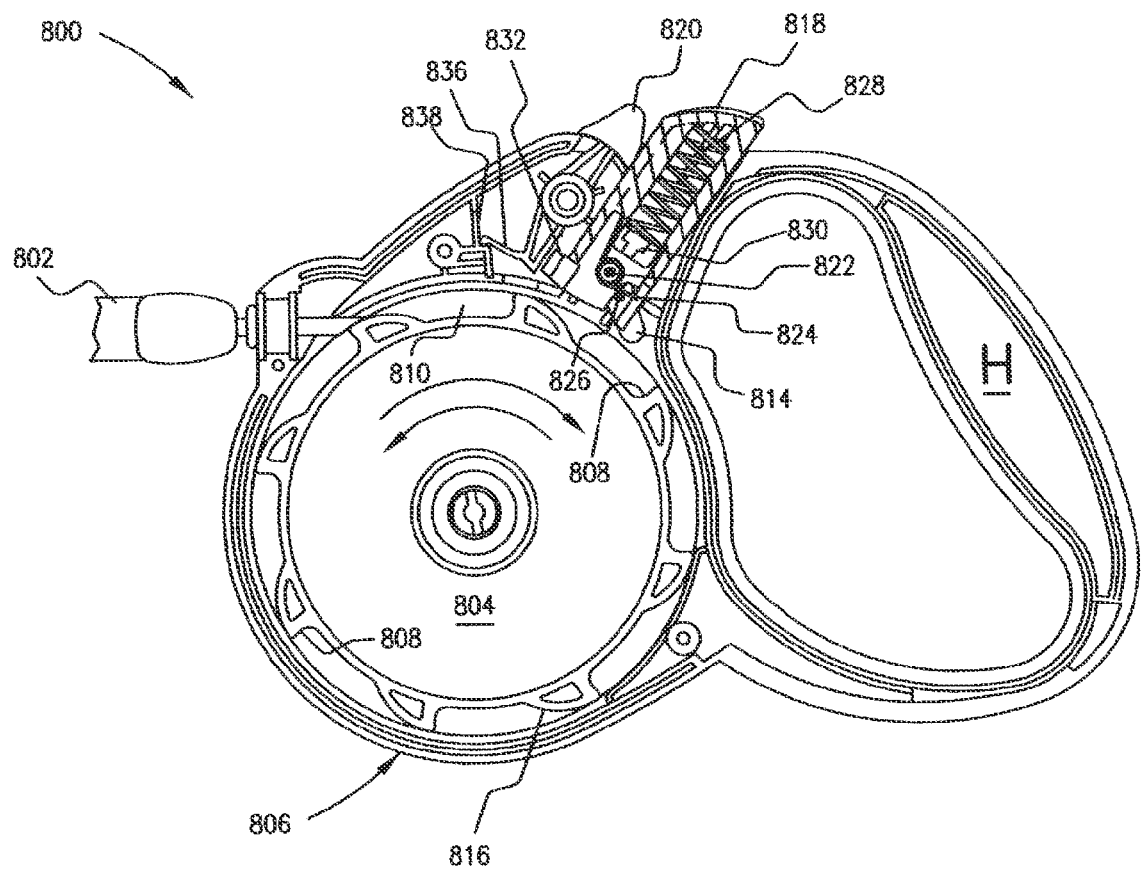
FIG. 18 is an illustration of an alternative embodiment of a retractable leash assembly for a single leash subject, which provides and allows for self-winding of a retractable lead associated therewith, whether or not the brake is engaged, depicting the retractable leash assembly with operating button up and the retractable leash assembly in a free spooling mode of operation.

Best seen with regard to FIG. 18, retractable leash assembly 800 is depicted with operating button 818 up, in its neutral and outward-most, unengaged, unlocked position. In this configuration, retractable leash assembly 800 acts in a free spooling mode of operation. In such mode of operation, leash 802 is played-out under tension when an attached subject moves away from the user. On the other hand, leash 802 is retracted by rotational operation of spring-biased spool 804 as the attached subject moves toward the user.

Figure 19:
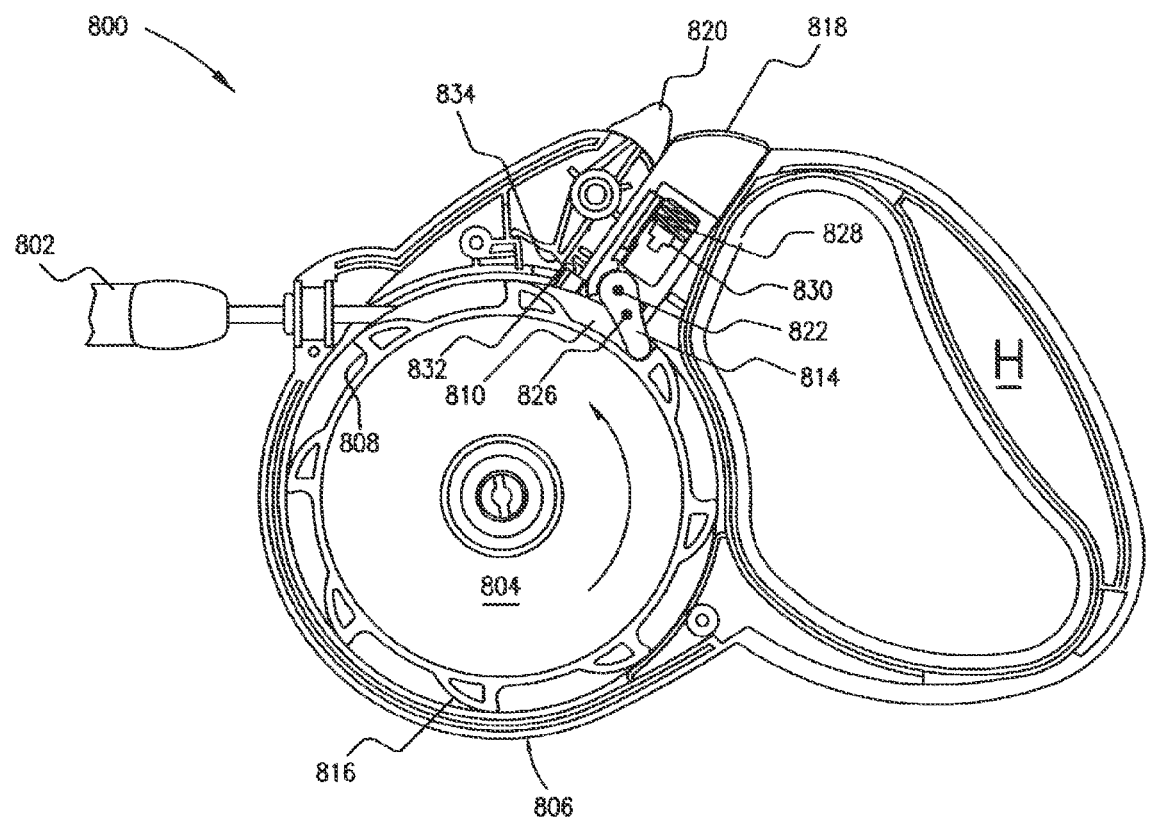
FIG. 19 is an illustration of the retractable leash assembly of FIG. 18, depicting the retractable leash assembly during leash play-out, with the operating button held down, the locking button not engaged, the pawl engaged, and the spool in a resulting locked mode of operation.

Best seen with regard to FIG. 19, which depicts retractable leash assembly 800 during leash 802 play-out, with operating button 818 held down by a user, but wherein locking button 820 has not been engaged by the user. In such configuration, pawls 814 of brake 812 are biased into pawl clearance area 810 when operating button 818 is depressed and held down by the user, and pawls 814 are engaged against braking notches 808. In this configuration, spool 804 is placed in a resulting locked mode of operation, since spool 804 cannot rotate against pawls 814.

Figure 20:
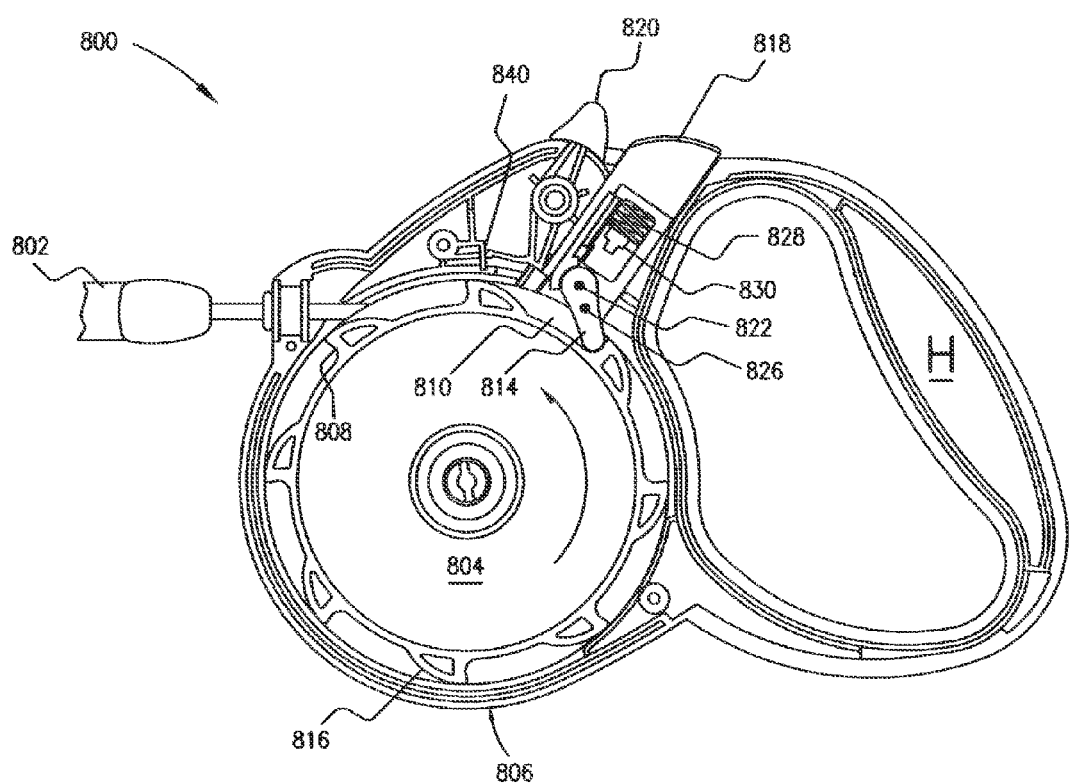
FIG. 20 is an illustration of the retractable leash assembly of FIG. 18, depicting the retractable leash assembly during leash play-out, with the operating button in a locked position, the locking button engaged, the pawl engaged, and the spool in a resulting locked mode of operation.

FIG. 20 depicts retractable leash assembly 800 during leash 802 play-out, with operating button 818 in a depressed position, locking button 820 engaged, pawls 814 engaged, and spool 804 in a resulting locked mode of operation, all as described above. In this configuration, the user merely needs to hold onto handle H to maintain the locked configuration.

Figure 21:
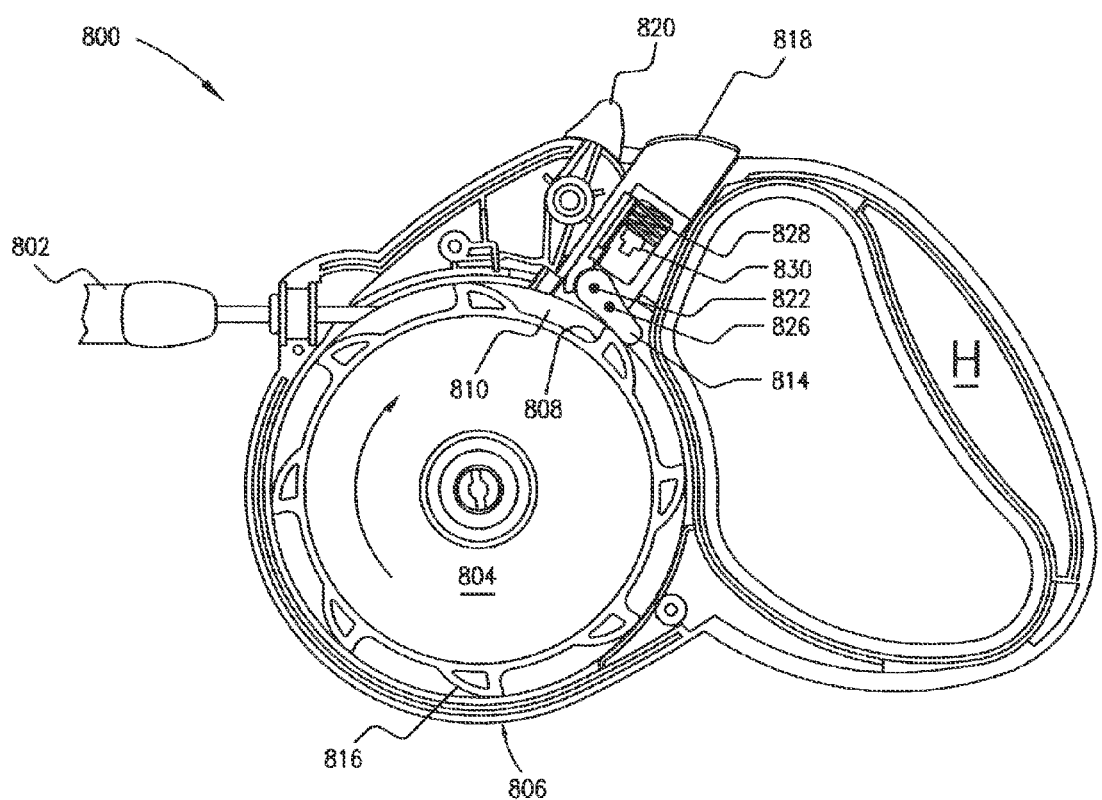
FIG. 21 is an illustration of the retractable leash assembly of FIG. 18, depicting the retractable leash assembly during leash retraction, with the operating button in a locked position, the locking button engaged, and the pawl and spool in a leash retracting mode of operation.
Figure 22A:
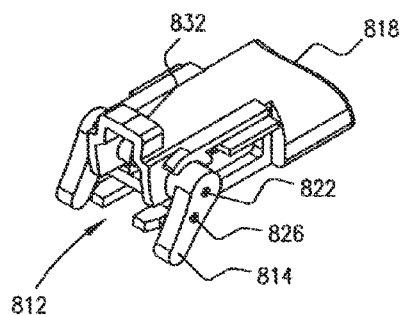
FIG. 22A is a perspective view illustration of a button, pawl assembly, and torsion spring assembly of the retractable leash assembly of FIG. 18.
Figures 22B, 22C, 22D:
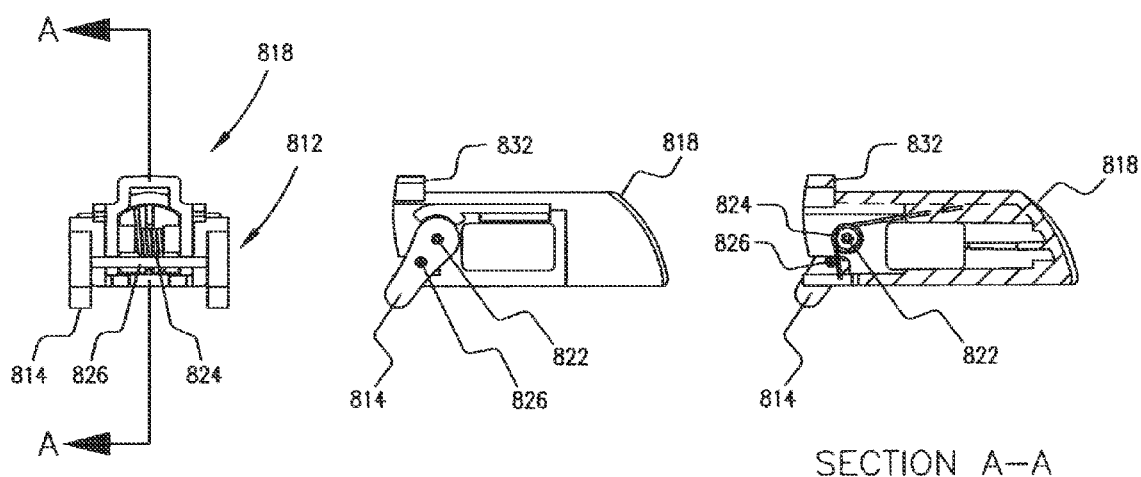
FIG. 22B is a spool-side, end view illustration of the button, pawl assembly, and torsion spring assembly of FIG. 22A.
FIG. 22C is a side view illustration of the button, pawl assembly, and torsion spring assembly of FIG. 22A.
FIG. 22D is a section view illustration of the button, pawl assembly, and torsion spring assembly of FIG. 22A, taken according to section line A-A depicted within FIG. 22B.

Best seen with reference to FIG. 21, retractable leash assembly 800 is depicted during leash 802 retraction operation, with operating button 818 in a locked position, locking button 820 engaged, and pawls 814 and spool 804 in a leash retracting mode of operation. With the above-described details of operation in mind, it now may be easily observed that spool 804 is urged and biased to rotate in a reversing, retraction mode of operation by spring 218. In this direction, spool 804 is allowed to rotate freely, since pawls 814 of brake 812 are allowed to traverse pawl clearance areas 810; whereafter, pawls 814 are biased by torsional spring 824 to ride easily and smoothly along cam surfaces 816. Spool 804 can, thereby, act wind-up leash 802, since there is no engagement between pawls 814 and braking notches 808.

Should the leashed subject pull away from the user while brake 812 remains engaged and/or locked, spool 804 is reversed into its play-out direction. Pawls 814 of brake 812 traverse pawl clearance areas 810; whereafter, pawls 814 are biased by torsional spring 824 to drop into and re-engage against braking notches 808.

It will now be seen that, in operation, a leashed subject can be allowed to freely roam, pulling away from and coming closer to the user, when retractable leash assembly 800 is in its deactivated, unlocked configuration, such as depicted in FIG.

18. When the user determines that it is dangerous or disadvantageous to allow the subject further outward travel, the user may depress operating button 818, as depicted in FIG. 19; thereby, locking spool 804 against further play-out movement through engagement of brake 812, as described above.

Importantly, it should be noted that, although retractable leash assembly 800 is locked, should the user move toward the leashed subject, or should the leashed subject move back toward the user, biased spool 804 will operate to retract and take-up leash 802, best seen with reference to FIG. 21. Should the leashed subject thereafter attempt to move away from the user while operating button 818 is depressed, retractable leash assembly 800 will maintain its locked configuration against such movement, and any amount of leash 802 that had previously been taken-up will be maintained on spool 804.

Should the user decide to maintain a locked configuration, the user may engage locking button 820, as depicted in FIG. 20. In such configuration, and with continued reference to FIG. 21, the user may release hold of operating button 818, and merely hold onto handle H, as provided by interoperation of locking button 820 with operating button 818, as has been described hereinabove.

Many modifications and other embodiments of the disclosure set forth herein will come to mind to one skilled in the art to which this disclosure pertains having the benefit of the teachings presented in the foregoing description. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A retractable leash comprising:
a housing;
a handle associated with the housing;
a leash;
a spool configured to rotate about a center rotational axis and being operable to engage the leash, the spool rotationally retracting the leash into a spooled formation; and
a brake configured to engage the spool by a user operating movement in a radial direction with respect to the center rotational axis of the spool to prevent the spool from rotating in an unspooling direction, the spool being rotatable in a spooling direction when the brake is engaged with the spool.

2. The retractable leash of claim 1, wherein
the spool is configured to be rotatable in the unspooling direction when the brake is not engaged with the spool.

3. The retractable leash of claim 1, wherein
the spool further comprises at least one braking notch and at least one pawl clearance area.

4. The retractable leash of claim 1, wherein
the brake further comprises a pawl that is biased into engagement with the spool.

5. The retractable leash of claim 4, wherein
the pawl is biased to engage the spool by a torsional spring.

6. The retractable leash of claim 1, wherein
the spool further comprises at least one braking notch and at least one pawl clearance area, and the brake further comprises a pawl that is biased into engagement with the spool by abutting one braking notch when the brake is engaged with the spool.

7. The retractable leash of claim 6, wherein
the spool further comprises at least one cam surface, and the pawl is configured to travel along one cam surface when the brake is engaged with the spool and the spool is enabled to rotate in a spooling direction.

8. A retractable leash comprising:
a housing having a handle and an operating button;
a leash operably affixed to a spool disposed within the housing, the spool being rotationally biased within the housing to retract the leash, the spool further comprising a braking notch, a cam surface disposed adjacent the braking notch, and a pawl clearance area disposed between the braking notch and the cam surface; and
a brake activated by the operating button, the brake comprising a pawl disposed at an end of the brake that is biased to engage the spool by a torsional spring, the brake urging the pawl into the pawl clearance area upon activation of the brake, the pawl being configured to engage the braking notch when the spool rotates in an unspooling direction, and to engage the cam surface when the spool rotates in a spooling direction.

9. The retractable leash of claim 8, further comprising
a locking button.

10. The retractable leash of claim 9, wherein
the locking button further comprises an abutment surface and an extension, the extension being associated with an operable portion of the housing.

11. The retractable leash of claim 10, wherein
the operable portion of the housing further having a wall cam surface.

12. The retractable leash of claim 11, wherein
the operating button further having a bearing surface.

13. The retractable leash of claim 12, wherein
the abutment surface engages the bearing surface when the extension engages the wall cam surface.

14. The retractable leash of claim 13, wherein
the operating button is in a brake-engaged, locked configuration when the abutment surface and the bearing surface are engaged.

15. The retractable leash of claim 8, further comprising
a locking button interoperable with the operating button to lock the operating button in a brake engaging position.

16. A retractable leash comprising:
a housing, said housing comprising a handle;
a leash operably affixed to a spool within said housing; said spool rotationally biased within said housing to wind said leash upon said spool; said spool further comprising in association with each side of said spool a plurality of braking notches, a plurality of pawl clearance areas, and a plurality of cam surfaces; and a brake activated by an operating button associated with said housing, said brake comprising, at a distal end of said operating button, a plurality of pawls, said pawls being operationally biased toward said spool by operation of a torsional spring; said brake, when activated, urging said each of said pawls into said pawl clearance areas on a respective side of said spool, said pawls each configured to engage a said braking notch on a respective side of said spool when said spool is rotated in an unwinding direction, and to engage a said cam surface on a respective side of said spool when said spool is rotated in a winding direction; and a locking button carrying a portion configured to engage with a portion of said operating button, and thereby to lock said brake when so engaged.

17. The retractable leash of claim 16, wherein said locking button further comprises an abutment surface and an extension, said extension operably associated with a portion of said housing; and wherein said operably associated portion of said housing further comprises a wall cam surface.

18. The retractable leash of claim 17, wherein said operating button further comprises a bearing surface.

19. The retractable leash of claim 18, wherein said abutment surface is engaged with said bearing surface when said extension engages said wall cam surface.

20. The retractable leash of claim 19, wherein when said abutment surface and said bearing surface are engaged, said operating button is established in a brake-engaged, locked configuration.

* * * * *